United States Statutory Invention Registration [19]

[11] Reg. Number: H98

Yabuki et al. [45] Published: Aug. 5, 1986

[54] HEAT-DEVELOPABLE COLOR PHOTOGRAPHIC MATERIAL

[75] Inventors: Yoshiharu Yabuki; Kozo Sato; Shinsaku Fujita; Koichi Koyama; Hiroshi Hara; Hideki Naito, all of Kanagawa, Japan

[73] Assignee: Fuji Photo Film Co., Ltd., Minami-ashigara, Japan

[21] Appl. No.: 540,737

[22] Filed: Oct. 11, 1983

[30] Foreign Application Priority Data

Oct. 8, 1982 [JP] Japan ..... 57-177148

[51] Int. Cl.[4] ..... G03C 1/40; G03C 5/54

[52] U.S. Cl. ..... 430/203; 430/223; 430/351; 430/559; 430/562

[58] Field of Search ..... 430/203, 223, 559, 562, 430/357, 617 , 619

[56] References Cited

U.S. PATENT DOCUMENTS 4,358,532 11/1982 Koyama et al. ..... 430/223
4,430,415 2/1984 Aono et al. ..... 430/203

FOREIGN PATENT DOCUMENTS 66282 12/1982 European Pat. Off. ..... 430/203

*Primary Examiner*—Edward A. Miller
*Attorney, Agent, or Firm*—Sughrue, Mion, Zinn, Macpeak and Seas

[57] ABSTRACT

A heat-developable color photographic material comprising a support having thereon at least a light-sensitive silver halide, a hydrophilic binder and a dye releasing redox compound represented by the following general formula (I):

(I)

wherein G represents —OR[1] or —NHR[2]; R[1] represents a hydrogen atom or a hydrolyzable group; R[2] represents a hydrogen atom or an alkyl group containing from 1 to 50 carbon atoms; Z represents an image forming dye group; A represents an atomic group necessary for forming an aromatic ring; Ball represents an organic immobilizing group on the aromatic ring, and when two Ball groups exist, they may be the same or different from each other; m represents an integer of 1 or 2; X represents a divalent organic group containing from 1 to 8 atoms and X with a nucleophilic group (Nu) is capable of forming a 5- to 12-membered ring together with an electrophilic center (the carbon atom marked with *) which is formed by oxidation; Nu represents a nucleophilic group; and n represents an integer of 1 or 2.

The heat-developable color photographic material can easily provide a clear and stable color image by imagewise exposure to light and a heat-development procedure. A method of forming a color image using the heat-developable color photographic material is also disclosed.

44 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEAT-DEVELOPABLE COLOR PHOTOGRAPHIC MATERIAL

FIELD OF THE INVENTION

The present invention relates to a process of forming a color image by heat-development. Particularly, the present invention relates to a novel process for obtaining a color image by heat diffusion transfer of a dye released upon heat-development of a heat-developable color photographic material containing a dye releasing compound which releases a diffusible dye upon heat-development into a support capable of receiving a dye.

BACKGROUND OF THE INVENTION

Photographic processes using silver halide have been most widely used in the past due to their excellent photographic properties such as sensitivity or control of gradation, etc., as compared with other photographic processes, such as an electrophotographic process or a diazo photographic process. In recent years, with respect to image formation processes for photographic materials using silver halide, many techniques capable of easily and quickly obtaining images have been developed by changing the conventional wet process using a developing solution into a dry development process such as a process using heat, etc.

Heat-developable photographic materials are known in the field of these techniques. Heat-developable photographic materials and processes therefor have been described in U.S. Pat. Nos. 3,152,904, 3,301,678, 3,392,020 and 3,457,075, British Pat. Nos. 1,131,108 and 1,167,777, and *Research Disclosure,* No. 17029, pages 9 to 15 (June, 1978).

Many different processes for obtaining color images have been proposed. With respect to processes for forming color images by the reaction of an oxidation product of a developing agent with a coupler, it has been proposed to use a p-phenylenediamine type reducing agent and a phenolic coupler or an active methylene coupler as described in U.S. Pat. No. 3,531,286, a p-aminophenol type reducing agent as described in U.S. Pat. No. 3,761,270, a sulfonamidophenol type reducing agent as described in Belgian Pat. No. 802,519 and *Research Disclosure,* pages 31 and 32 (September, 1975) and the combination of a sulfonamidophenol type reducing agent and a 4-equivalent coupler as described in U.S. Pat. No. 4,021,240. These processes, however, are disadvantageous in that turbid color images are formed, because a reduced silver image and a color image are simultaneously formed on the exposed area after heat-development. In order to eliminate these disadvantages, there have been proposed a process which comprises removing a silver image by liquid processing or a process which comprises transferring only the dye to another layer, for example, a sheet having an image receiving layer. However, the latter process is not desirable because it is not easy to transfer only the dye as distinguishable from unreacted substances.

Another process which comprises introducing a nitrogen containing heterocyclic group into a dye, forming a silver salt and releasing a dye by heat-development has been described in *Research Disclosure,* No. 16966, pages 54 to 58 (May, 1978). According to this process, clear images cannot be obtained, because it is difficult to control the release of dyes from nonexposed areas, and thus it is not a conventionally applicable process.

Also, processes for forming a positive color image by a silver dye bleach process utilizing heat-development, with useful dyes and methods for bleaching have been described, for example, in *Research Disclosure,* No. 14433, pages 30 to 32 (April, 1976), ibid., No. 15227, pages 14 and 15 (December, 1976) and U.S. Pat. No. 4,235,957.

However, this process requires an additional step and an additional material for accelerating bleaching of dyes, for example, heating with a superposed sheet with an activating agent. Furthermore, it is not desirable because the resulting color images are gradually reduced and bleached by coexisting free silver during long periods of preservation.

Moreover, a process for forming a color image utilizing a leuco dye has been described, for example, in U.S. Pat. Nos. 3,985,565 and 4,022,617. However, this process is not desirable because it is difficult to stably incorporate the leuco dye in the photographic material and coloration gradually occurs during preservation.

SUMMARY OF THE INVENTION

The present invention provides a novel process for forming a color image by heat-development, eliminating the drawbacks present in known materials.

Therefore, an object of the present invention is to provide a novel process for forming a color image which comprises transferring a hydrophilic dye released upon heat-development into an image receiving material containing a mordant to obtain a color image.

Another object of the present invention is to provide a process for obtaining a clear color image by a simple procedure.

Still another object of the present invention is to provide a process for obtaining a color image which is stable for a long period of time.

These and other objects of the present invention will become more apparent from the following detailed description and examples.

These objects of the present invention are accomplished with a heat-developable color photographic material comprising a support having thereon at least a light-sensitive silver halide, a hydrophilic binder and a dye releasing redox compound capable of reducing the silver halide represented by the following general formula (I):

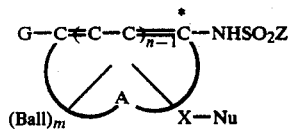

(I)

wherein G represents —$OR^1$ or —$NHR^2$; $R^1$ represents a hydrogen atom or a hydrolyzable group; $R^2$ represents a hydrogen atom or an alkyl group containing from 1 to 50 carbon atoms; Z represents an image forming dye group; A represents an atomic group necessary for forming an aromatic ring; Ball represents an organic immobilizing group on the aromatic ring, and when two Ball groups exist, they may be the same or different from each other; m represents an integer of 1 or 2; X represents a divalent organic group containing from 1 to 8 atoms and X with a nucleophilic group (Nu) is capable of forming a 5- to 12-membered ring together with an electrophilic center (the carbon atom marked with *) which is formed by oxidation; Nu represents a nucleophilic group; and n represents an integer of 1 or 2.

DETAILED DESCRIPTION OF THE INVENTION

The heat-developable color photographic material of the present invention can simultaneously provide a silver image having a negative-positive relationship to the original and a diffusible dye on the part corresponding to the silver image utilizing only heat-development after imagewise exposure to light. That is, when the heat-developable color photographic material of the present invention is imagewise exposed to light and developed by heating, an oxidation-reduction reaction occurs between exposed light-sensitive silver halide and a dye releasing redox compound to form a silver image in the exposed area. In this step, the dye releasing redox compound is oxidized by the silver halide to form an oxidized product. This oxidized product is cleaved and consequently the hydrophilic diffusible dye is released. Accordingly, the silver image and the diffusible dye are formed in the exposed area, and a color image is obtained by transferring the diffusible dye.

The reaction of releasing a diffusible dye according to the present invention is completed with a dye film under high temperature. This releasing reaction of a diffusible dye is believed to be a reaction by the so-called attack with a nucleophilic agent and is usually carried out in a liquid. In the present invention, the compounds generally show a high reaction rate even in the dry film, although the rate varies depending on a kind of the dye releasing redox compounds. The reaction rates found were unexpectedly high. Further, the dye releasing redox compound according to the present invention can undergo an oxidation-reduction reaction with silver halide without the assistance of a dye releasing activator. This is also an unexpected result based on previous information of what may happen at ambient temperature.

The dye releasing redox compound capable of releasing a hydrophilic diffusible dye which can be used in the present invention can be represented by the following general formula (I):

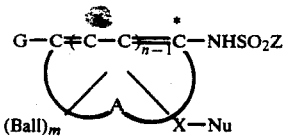

(I)

wherein G represents —$OR^1$ or —$NHR^2$; $R^1$ represents a hydrogen atom or a hydrolyzable group (e.g., an acetyl group, a propionyl group, a benzoyl group, a p-nitrobenzoyl group, a phenoxycarbonyl group, an m-nitrophenoxycarbonyl group, etc.); $R^2$ represents a hydrogen atom or an alkyl group containing from 1 to 50 carbon atoms, and preferably from 1 to 18 carbon atoms (for example, a methyl group, an ethyl group, a propyl group, a butyl group, an octyl group, a lauryl group, a hexadecyl group, etc.); Z represents an image forming dye group; A represents an atomic group necessary for forming an aromatic ring, such as a benzene ring, a naphthalene ring, a hetero ring, etc., (these atoms comprising carbon atoms, nitrogen atoms and/or oxygen atoms); typical but non-limiting examples of the hetero ring include an indole ring, a carbazole ring, a benzofuran ring, a dibenzofuran ring, a phenothiazine ring, a phenoxazine ring, etc.; Ball represents an organic immobilizing group (ballast group) present on the aromatic ring (such as a benzene ring, a naphthalene ring, a hetero ring, etc.), with at least one of the immobilizing groups containing from 8 to 50 carbon atoms, and preferably from 8 to 22 carbon atoms, and, when two Ball groups exist, they may be the same or different from each other; m represents an integer of 1 or 2; the aromatic ring of A may have other substituents in addition to the organic immobilizing groups, for example, an alkyl group (e.g., a methyl group, an ethyl group, a propyl group, an isopropyl group, an n-butyl group, an isobutyl group, a sec-butyl group, a t-butyl group, an n-hexyl group, a cyclohexyl group, etc.), an alkoxy group or substituted alkoxy group (e.g., a methoxy group, an ethoxy group, a propyloxy group, a methoxyethoxy group, an ethoxyethoxy group, etc.), an acylamino group (e.g., an acetylamino group, a propionylamino group, a p-nitrobenzoylamino group, etc.), a carbamoyl group (e.g., a methylcarbamoyl group, an ethylcarbamoyl group, etc.), a sulfonamido group (e.g., a methanesulfonamido group, a toluenesulfonamido group, etc.), a sulfamoyl group (e.g., a methylsulfamoyl group, a butylsulfamoyl group, etc.), an acyl group (e.g., an acetyl group, a propionyl group, etc.), a nitro group, a cyano group, or a halogen atom (e.g., a chlorine atom, a bromine atom, etc.); X represents a divalent organic group containing from 1 to 8 atoms and X with a nucleophilic group (Nu) is capable of forming a 5- to 12-membered ring, preferably a 5- to 8-membered ring, and more preferably a 5- or 6-membered ring, together with an electrophilic center (the carbon atom marked with *) which is formed by oxidation in, for example, development processing, etc., including, for example, a $C_1$–$C_8$ methylene group, an oxamethylene group, an aminomethylene group, a sulfonyl group, a carbonyl group, an amido group, a carbamoyl group, a sulfonamido group, a sulfamoyl group, a phenylene group or the like; Nu represents a nucleophilic group selected from a hydroxy group, an amino group, a carboxylic acid group, a sulfonic acid group, and the precursors thereof (for example, acyl or ester derivatives thereof); and n represents an integer of 1 or 2.

The ballast group represented by Ball is preferably a hydrophobic group containing from 8 to 50 carbon atoms, more preferably from 8 to 22 carbon atoms. Such a ballast group is bound to the redox portion of the compound according to the present invention directly or through a linking group (e.g., an imino bond, an ether bond, a thioether bond, a carbonamido bond, a sulfonamido bond, a ureido bond, an ester bond, an imido bond, a carbamoyl bond, a sulfamoyl bond, and the combination thereof).

Specific examples of the ballast group include: alkyl groups and alkenyl groups (e.g., a dodecyl group, an octadecyl group, etc.), alkoxyalkyl groups (e.g., a 3-(octyloxy)propyl group and 3-(2-ethylundecyloxy)propyl group as described in Japanese Patent Publication No. 27563/64), alkylaryl groups (e.g., a 4-nonylphenyl group, a 2,4-di-tert-butylphenyl group, etc.), alkylaryloxyalkyl groups (e.g., a 2,4-di-tert-pentylphenoxymethyl group, an α-(2,4-di-tert-pentylphenoxy)propyl group, a 1-(3-pentadecylphenoxy)ethyl group, etc.), acylamidoalkyl groups (e.g., those described in U.S. Pat. Nos. 3,337,344 and 3,418,129, a 2-(N-butylhexadecanamido)ethyl group, etc.), alkoxyaryl and aryloxyaryl groups (e.g., a 4-(n-octadecyloxy)phenyl group, a 4-(4-n-dodecylphenyloxyphenyl group, etc.), residues containing an alkyl or alkenyl long-chain aliphatic group and a water-solubilizing group such as a carboxy group or a sulfo group (e.g., a 1-carboxymethyl-2-nonanedecenyl group, a 1-sulfoheptadecyl group, etc.), ester-substituted alkyl groups (e.g., a 1-ethoxycarbonylheptadecyl group, a 2-(n-dodecyloxycarbonyl)ethyl group, etc.), aryl or hetero ring-substituted alkyl groups (e.g., a 2-[4-(3-methoxycarbonylheneicosanamido)-phenyl]ethyl group, a 2-[4-(2-n-octadecylsuccinimido)-phenyl]ethyl group, etc.), and aryloxyalkoxycarbonyl-substituted aryl groups (e.g., a 4-[2-(2,4-di-tert-pentylphenoxy)-2-methylpropyloxycarbonyl]phenyl group, etc.).

Of the above-described organic ballast groups, particularly preferable are those which are bound to a linking group as shown in the following general formulae:

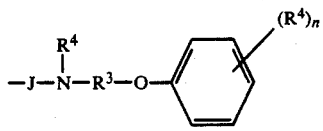

(1)

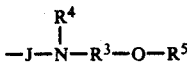

(2)

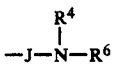

(3)

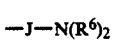

(4)

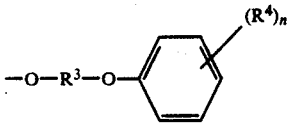

(5)

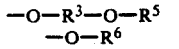

(6)

(7)

wherein J represents —CO— or —$SO_2$—; $R^3$ represents an alkylene group containing from 1 to 10 carbon atoms, and preferably from 1 to 6 carbon atoms (e.g., a propylene group or a butylene group, etc.); $R^4$ (which may be the same as or different from each other when more than one $R^4$ is present) represents a hydrogen atom or an alkyl group containing from 1 to 30 carbon atoms, and preferably from 1 to 20 carbon atoms (e.g., a tert-amyl group or an n-pentadecyl group); n represents an integer of 1 to 5 (preferably 1 or 2); $R^5$ represents an alkyl group containing from 4 to 30 carbon atoms, and preferably from 10 to 20 carbon atoms (e.g., a dodecyl group, a tetradecyl group or a hexadecyl group); and $R^6$ represents an unsubstituted alkyl group containing from 8 to 30 carbon atoms, and preferably from 10 to 20 carbon atoms (e.g., a hexadecyl group or an octadecyl group) or a substituted alkyl group containing in total 8 or more carbon atoms (the alkyl moiety containing 1 or more carbon atoms; the substituent being exemplified by a carbamoyl group, etc.).

The most preferable examples of the dye releasing redox compounds according to the present invention are aminonaphthol compounds and aminophenol compounds represented by the following general formulae (II) and (III), respectively, in which a dye or a dye precursor is contained.

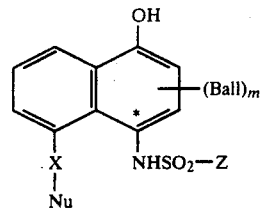

(II)

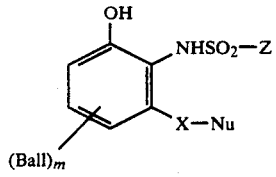

(III)

In the above formulae, Z, X, Nu, Ball, and m are the same as defined in the general formula (I).

While not intending to limit the reaction mechanism of the present invention by a particular theory or mechanism, it is explained in the simplified scheme described below. It is believed that the chemical reaction of the present invention described below takes place and consequently a dye is rapidly released without the presence of a dye releasing activator.

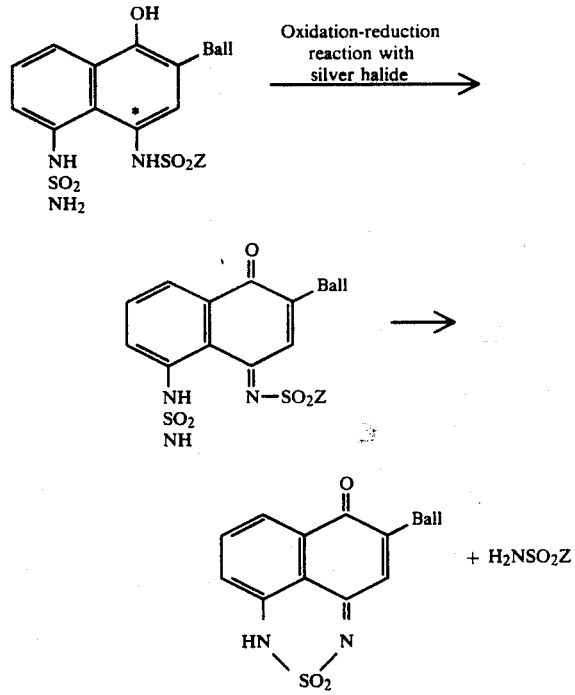

In the present invention, when the redox portion of the compound is oxidized, the nucleophilic group, such as an amino group, rapidly attacks the electrophilic center formed by the oxidation and, as a result, the dye portion is split off as a sulfonamido derivative having an extremely high diffusibility and showing excellent mordantability. On the other hand, when no oxidation takes place, the nucleophilic group cannot attack the target, and thus the dye is not split off.

The effects obtained by the dye releasing redox compounds according to the present invention are principally due to the intramolecular nucleophilic reaction and, as compared with conventional compounds utilizing an intermolecular nucleophilic reaction, the compounds according to the present invention provide the following advantages:

(1) An image can be formed in a shorter time due to the fast dye-releasing rate.

(2) A high color density can be obtained due to the high dye-releasing rate.

(3) Since a higher transferred density can be obtained as compared with conventionally known compounds even at a low pH, the use of a base, as a development accelerator, is not necessary or the amount of the base can be greatly reduced.

(4) As a result, the stability of the photographic material during preservation is remarkably improved.

(5) An image can be formed at a lower temperature as compared with conventional compounds.

Examples of dyes which can be used for image forming dye groups represented by Z in the general formulae (I), (II) and (III) include azo dyes, azomethine dyes, anthraquinone dyes, naphthoquinone dyes, styryl dyes, nitro dyes, quinoline dyes, carbonyl dyes and phthalocyanine dyes, etc. Representative examples of them are set forth below and are classified by hue. Further, these dyes can be used in a temporarily shifted form to a shorter wavelength region which is capable of regeneration during the development processing.

Yellow (1)

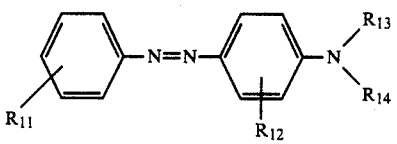

(2)

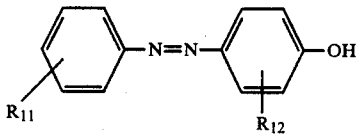

(3)

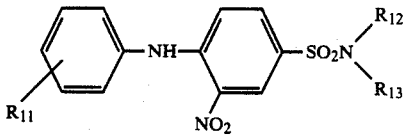

(4)

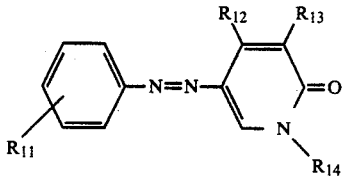

(5)

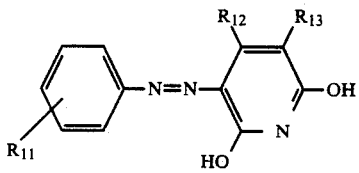

-continued (6)

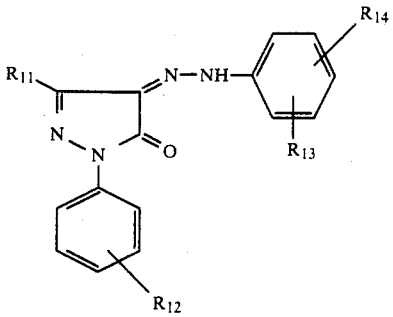

(7)

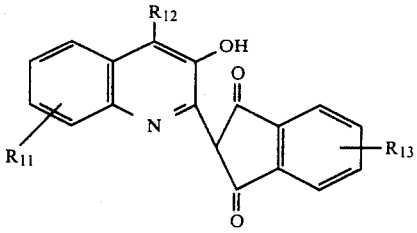

(8)

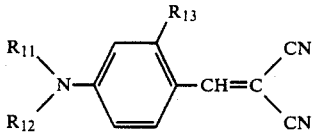

(9)

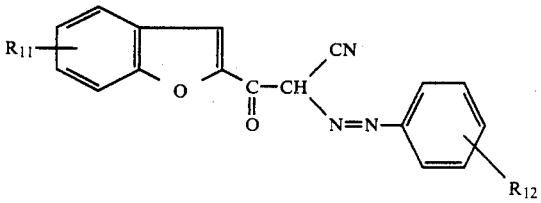

(10)

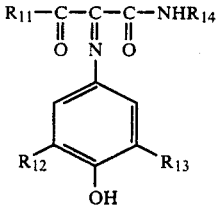

Magenta (11)

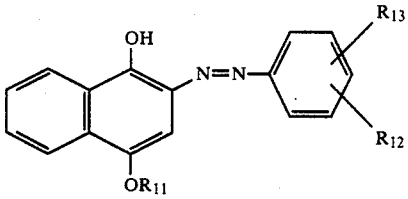

(12)

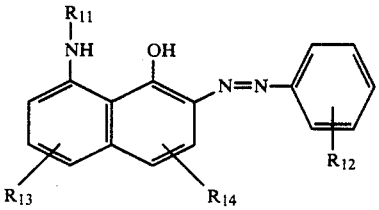

-continued
(13)
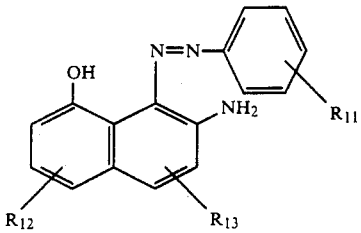
(14)
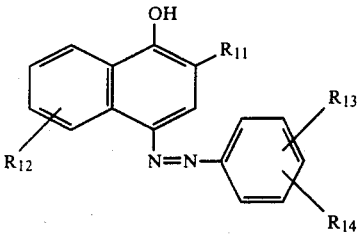
(15)
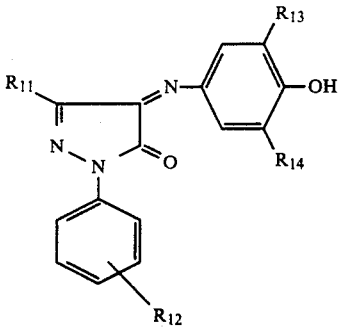
(16)
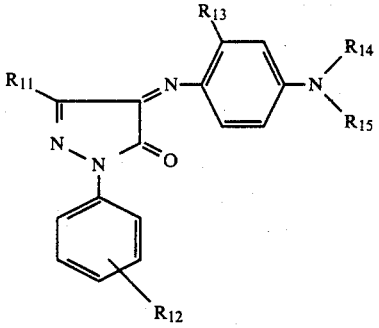
(17)
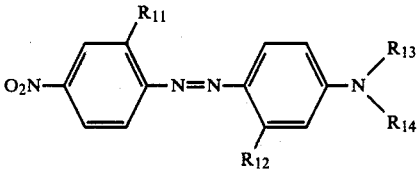
(18)
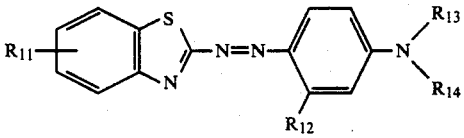
(19)
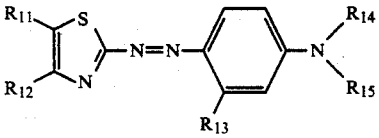
-continued
(20)
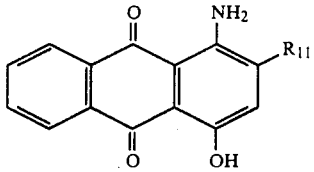
(21)
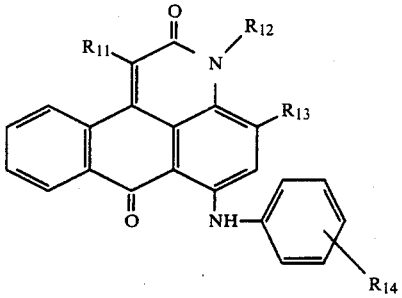
(22)
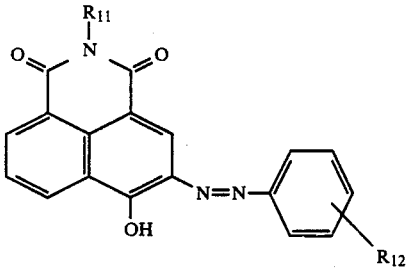
Cyan
(23)
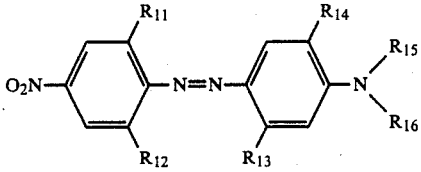
(24)
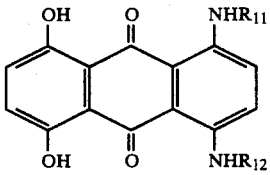
(25)
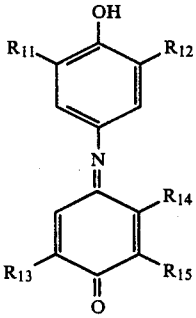

-continued (26)

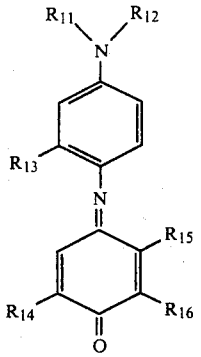

(27)

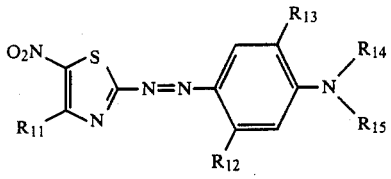

(28)

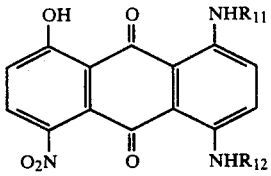

(29)

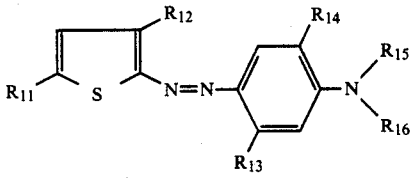

(30)

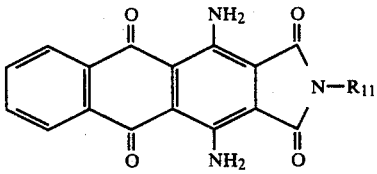

(31)

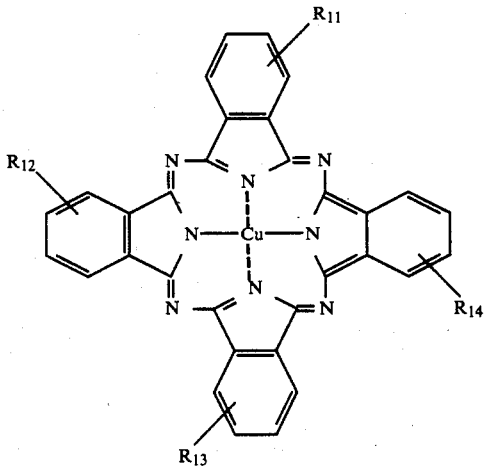

-continued (32)

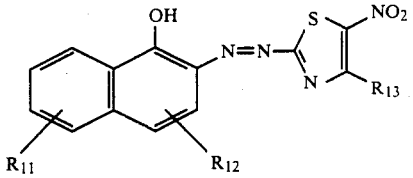

(33)

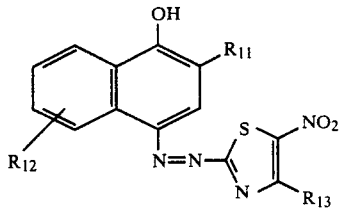

(34)

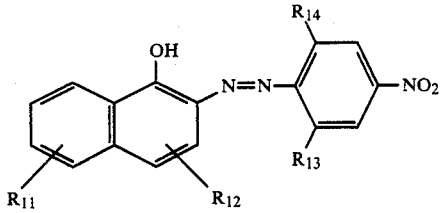

(35)

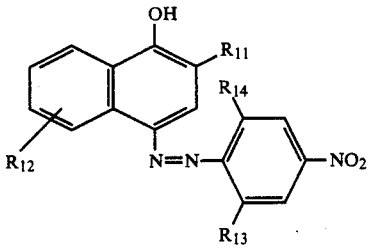

wherein $R_{11}$ to $R_{16}$ each represents a hydrogen atom or a substituent selected from an alkyl group, a cycloalkyl group, an aralkyl group, an alkoxy group, an aryloxy group, an aryl group, an acylamino group, an acyl group, a cyano group, a hydroxyl group, an alkylsulfonylamino group, an arylsulfonylamino group, an alkylsulfonyl group, a hydroxyalkyl group, a cyanoalkyl group, an alkoxycarbonylalkyl group, an alkoxyalkyl group, an aryloxyalkyl group, a nitro group, a halogen atom, a sulfamoyl group, an N-substituted sulfamoyl group, a carbamoyl group, an N-substituted carbamoyl group, an acyloxyalkyl group, an amino group, a substituted amino group, an alkylthio group or an arylthio group. The alkyl moiety and the aryl moiety in the above-described substituents may be further substituted with a halogen atom, a hydroxy group, a cyano group, an acyl group, an acylamino group, an alkoxy group, a carbamoyl group, a substituted carbamoyl group, a sulfamoyl group, a substituted sulfamoyl group, a carboxy group, an alkylsulfonylamino group, an arylsulfonylamino group or a ureido group.

Characteristics required for the image forming dye are as follows.

1. It was a hue suitable for color reproduction.
2. It has a large molecular extinction coefficient.
3. It is fast to light and heat and stable for the dye releasing activator and other additive included in the system.
4. It is easily synthesized.
5. It has a hydrophilic group and a mordantability to a cationic mordant.

Specific examples of preferred image forming dyes which satisfy the above-described requirements (which can be used for image forming dye groups represented by Z in the general formulae (I), (II) and (III)) are described in the following.
Yellow
(1)
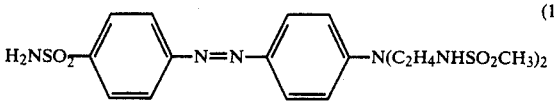
(2)
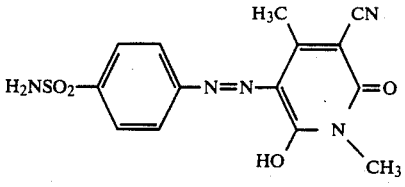
(3)
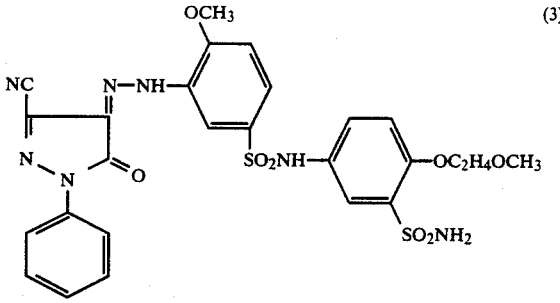
(4)
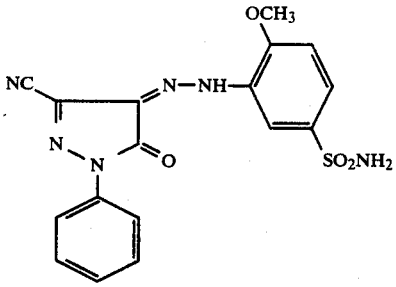
(5)
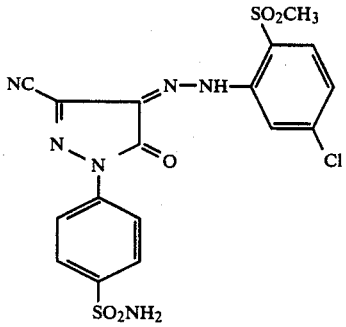
-continued
(6)
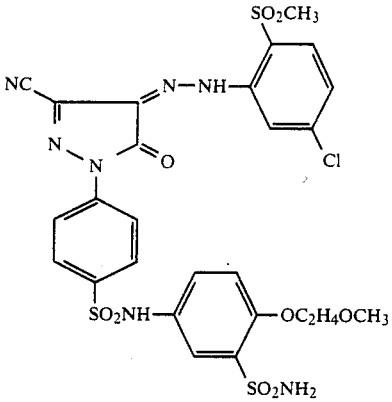
(7)
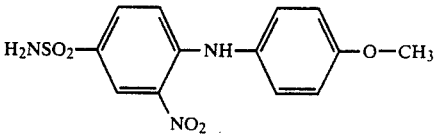
(8)
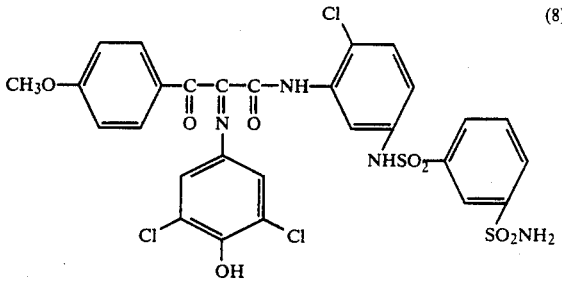
(9)
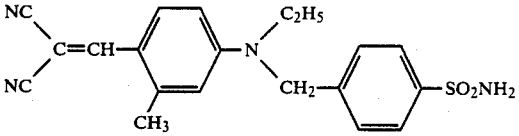
(10)
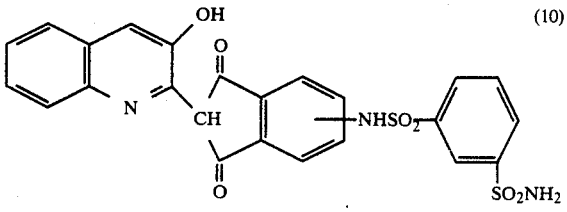
Magenta
(11)
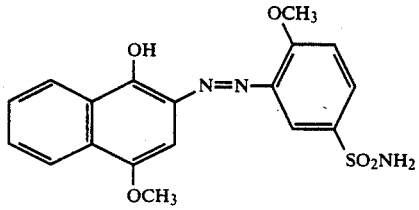

-continued
(12)
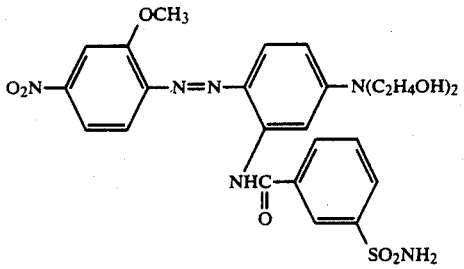
(13)
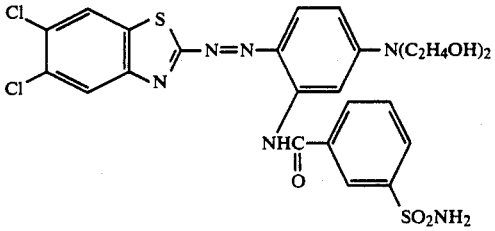
(14)
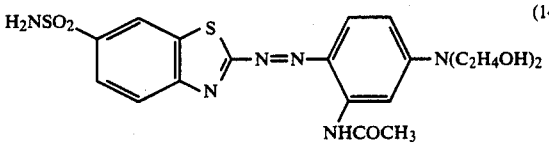
(15)
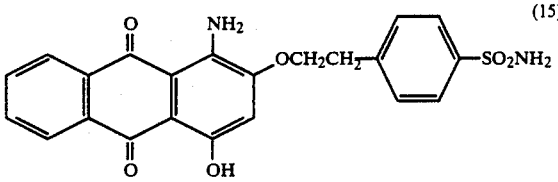
(16)
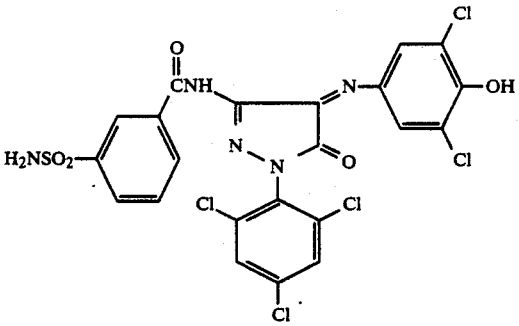
(17)
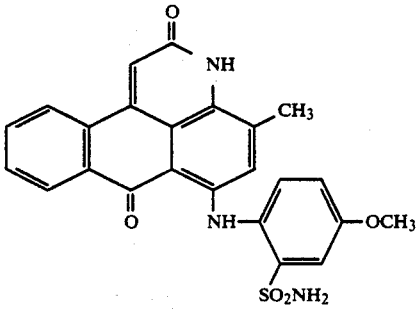
-continued
(18)
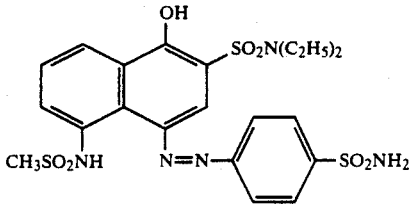
(19)
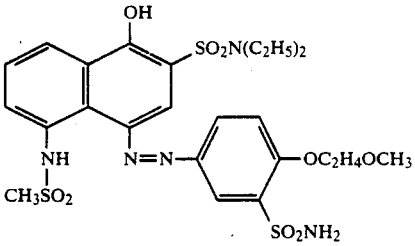
(20)
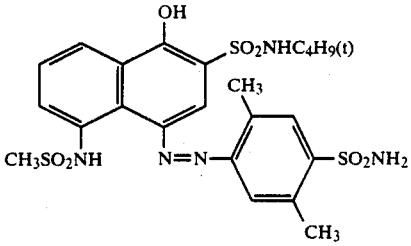
Cyan
(21)
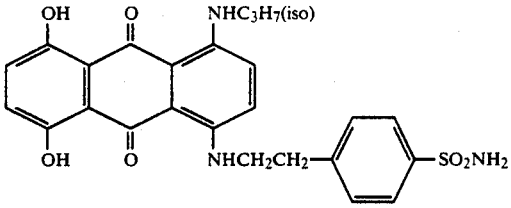
(22)
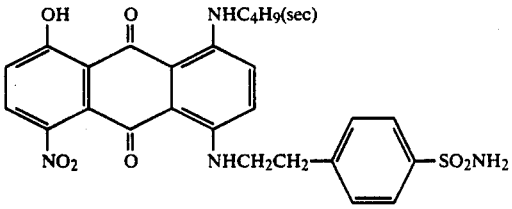
(23)
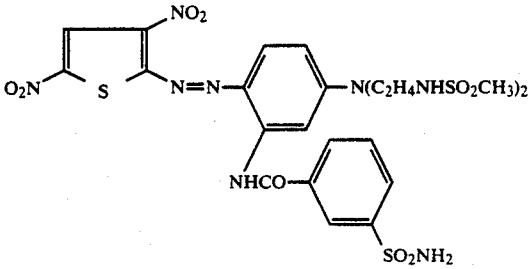

-continued (24)

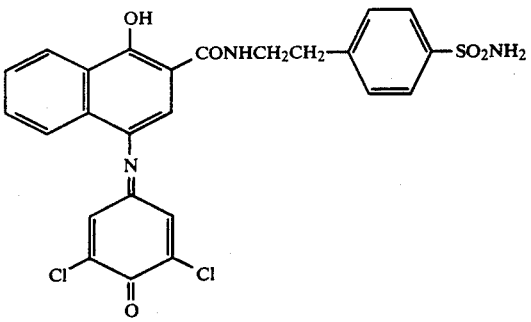

(25)

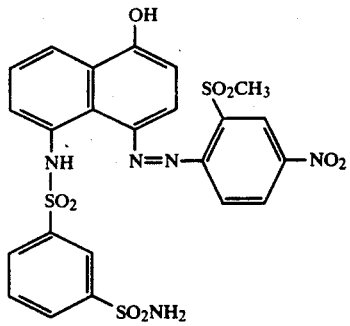

(26)

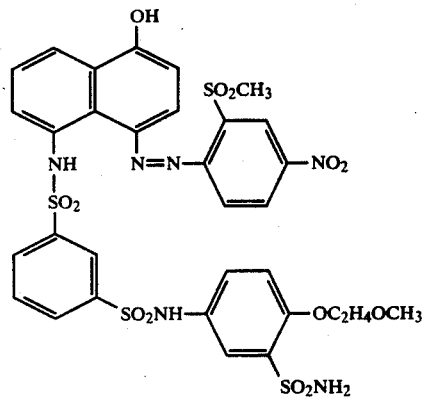

(27)

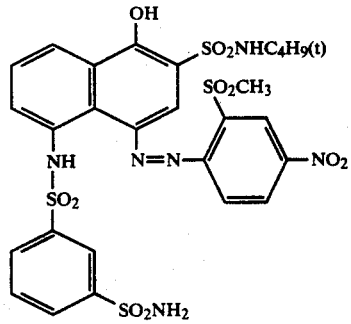

wherein the end group —$SO_2NH_2$ in these dyes represents a group necessary to bond to the reducing group.

Examples of the hydrophilic groups include a hydroxy group, a carboxy group, a sulfo group, a phosphoric acid group, an imido group, a hydroxamic acid group, a quaternary ammonium group, a carbamoyl group, a substituted carbamoyl group, a sulfamoyl group, a substituted sulfamoyl group, a sulfamoylamino group, a substituted sulfamoylamino group, a ureido group, a substituted ureido group, an alkoxy group, a hydroxyalkoxy group, an alkoxyalkoxy group, etc.

In the present invention, those in which the hydrophilic property thereof is increased by dissociation of a proton under a basic condition (pKa<12) are particularly preferred. Examples of these groups include a phenolic hydroxy group, a carboxy group, a sulfo group, a phosphoric acid group, an imido group, a hydroxamic acid group, a (substituted) sulfamoyl group, a (substituted) sulfamoylamino group, etc.

In the following, specific examples of the preferred dye releasing redox compounds are described.

(1)

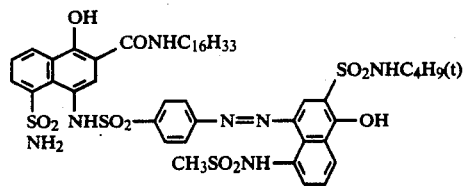

(2)

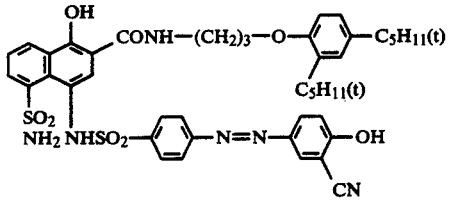

(3)

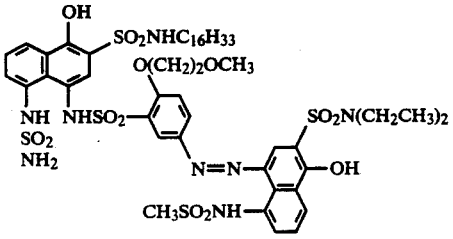

(4)

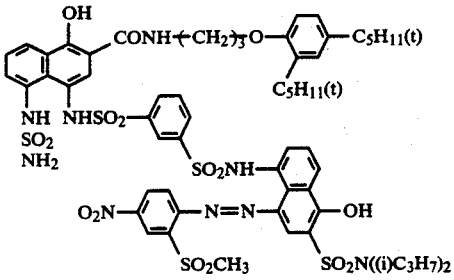

(5)

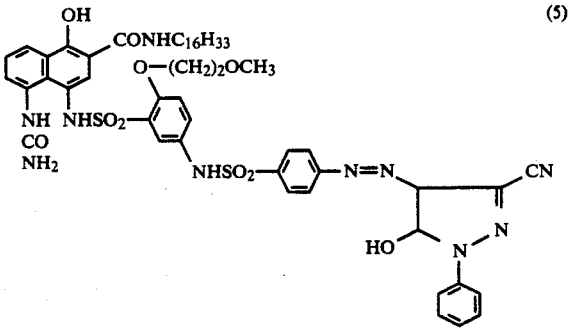

-continued
(6)
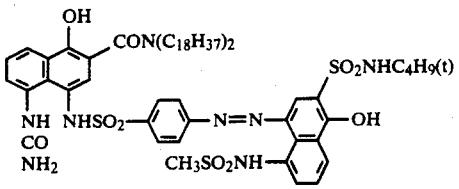
(7)
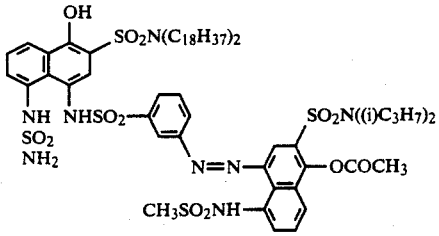
(8)
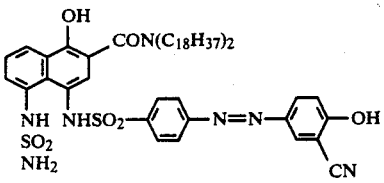
(9)
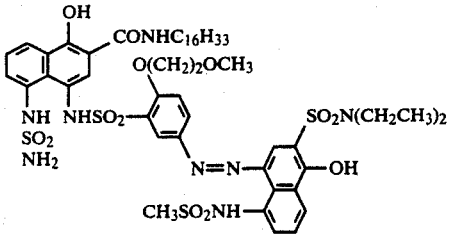
(10)
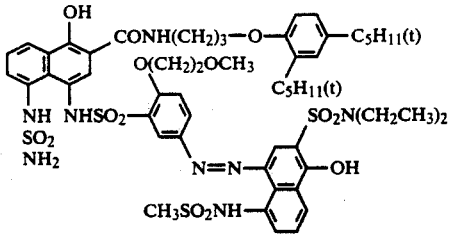
(11)
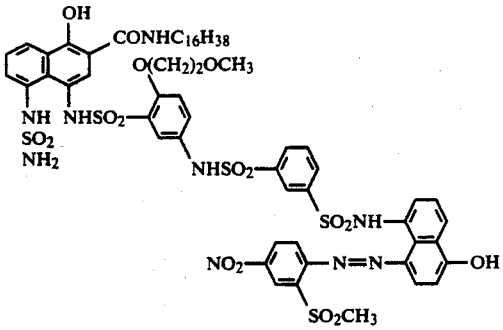
(12)
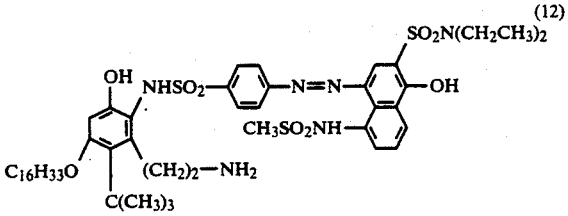
-continued
(13)
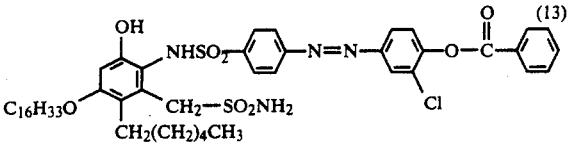
(14)
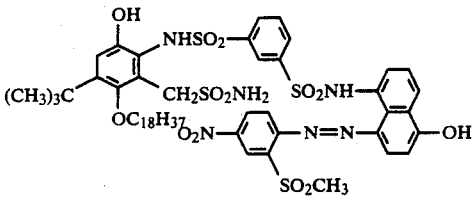
(15)
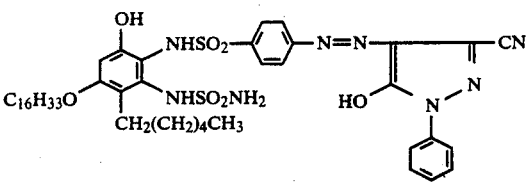
(16)
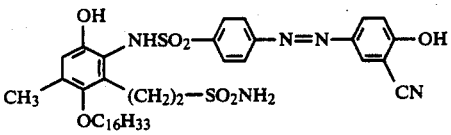
(17)
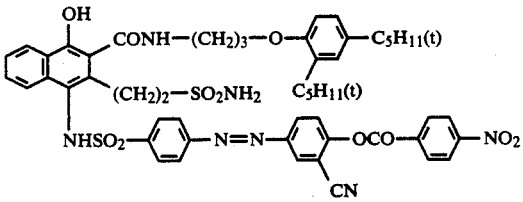
(18)
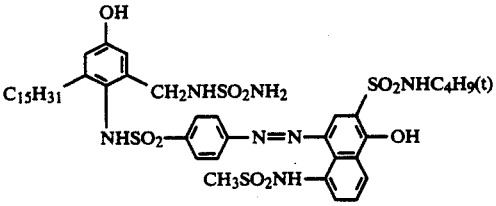
(19)
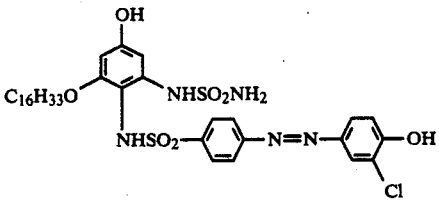
(20)
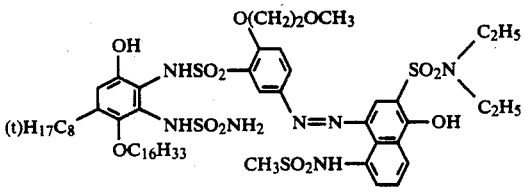

-continued

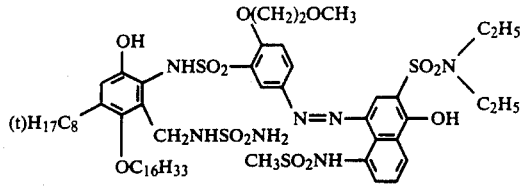

(21)

Examples of the particularly preferred dye releasing redox compounds are Compounds (3), (4), (7), (8), (9) and (10).

The dye releasing redox compounds according to the present invention can be used individually or in combinations of two or more.

The compounds represented by the general formula (I) according to the present invention can be generally synthesized by reacting an azo dye sulfonyl chloride with a variety of aminophenol or aminonaphthol derivatives having an organic ballast group and a nucleophilic group. Processes for synthesizing the dye portion and the sulfonyl chloride derivatives thereof are described in Japanese Patent Application (OPI) Nos. 12851/73, 33826/73 (corresponding to U.S. Pat. No. 351,673), 114424/74 (corresponding to U.S. Pat. No. 3,931,144) and 126332/74 (corresponding to U.S.Pat. Nos. 3,932,381 and 4,268,606) (the term "OPI" as used herein refers to a "published unexamined Japanese patent application").

Synthesis example of the specific compound according to the present invention will now be described below.

SYNTHESIS EXAMPLE 1

Synthesis of Compound (3)

(a) Synthesis of 1-acetoxy-5-acetaminonaphthalene-2-sulfonic acid 140 g of 5-amino-1-naphthol-2-sulfonic acid synthesized according to the process described in Japanese Patent Application (OPI) No. 115528/75 (corresponding to U.S. Pat. No. 3,932,380) was heated to 80° to 90° C. for about 30 minutes while stirring together with 700 ml of acetic anhydride and 50 g of sodium acetate. Then, the reaction solution was allowed to cool to room temperature, and precipitated crystals were collected by filtration, washed with about 2 liters of acetone, and dried to obtain 205 g of product (containing about 20% sodium acetate). Yield: 87%.

(b) Synthesis of 1-acetoxy-5-acetaminonaphthalene-2-sulfonyl chloride 100 g of 1-acetoxy-5-acetaminonaphthalene-2-sulfonic acid was added to 500 ml of sulfolane, and 200 ml of phosphorus oxychloride was dropwise added thereto at 40° C. while stirring. After continuing stirring for about 1 hour, the reaction mixture was poured into 2 liters of ice water, and the precipitated crystals were collected by filtration, washed with water until the filtrate did not show acidity, and air-dried as such for 24 hours to obtain 70 g (81% yield) of product.

(c) Synthesis of 5-amino-2-hexadecylsulfamoyl-1-naphthol 30 g of hexadecylamine was dissolved in 250 liters of acetone. To this solution was added gradually a solution of 40 g of 1-acetoxy-5-acetaminonaphthalene-2-sulfonyl chloride synthesized above in 150 ml of acetone while stirring, and, after completion of the addition, stirring was continued for about 1 hour at about 40° C. Then, the reaction solution was cooled with ice, and the precipitated crystals were collected by filtration and well washed with 1 liter of methanol. The crystals were refluxed for 8 hours together with 200 ml of ethanol, 30 g of sodium hydroxide and 100 ml of water. After being allowed to cool to room temperature, the solution was neutralized with acetic acid, and the crystals thus precipitated were collected by filtration and recrystallized from an ethanol-water mixture solvent to obtain 22 g (54% yield) of product.

(d) Synthesis of 5-sulfamoylamino-2-hexadecylsulfamoyl-1-naphthol 18 g of 5-amino-2-hexadecylsulfamoyl-1-naphthol obtained above was dissolved in 100 ml of acetone, 12 ml of pyridine was added thereto and, under stirring, 12 ml of sulfamoyl chloride dissolved by heating was added thereto followed by stirring the solution at 50° to 60° C. for about 2 hours. The reaction solution was then poured into 1 liter of dilute hydrochloric acid, and the crystals thus precipitated were collected by filtration and dried. Recrystallization of the crystals from ethanol gave 15 g (71% yield) of product.

(e) Synthesis of 5-sulfamoylamino-2-hexadecylsulfamoyl-4-4'-sulfophenylazo)-(1-naphthol 5 g of sulfanilic acid was dissolved in 40 ml of water containing 2 g of sodium carbonate, 5 ml of water containing 2.2 g of sodium nitrite was added thereto at 10° C. or less, and, while stirring, 50 g of ice was added thereto, followed by further adding thereto 8 ml of concentrated hydrochloric acid to prepare a diazo solution.

On the other hand, 5-sulfamoylamino-2-hexadecylsulfamoyl-1-naphthol obtained above was suspended in 100 ml of ethanol, and 150 ml of water containing dissolved therein 1.8 g of potassium hydroxide was added thereto followed by cooling with ice. To this coupler solution was added the previously prepared diazo solution at 5° to 10° C. under stirring. After leaving the solution for 30 minutes, a magenta-color dye was collected by filtration. The product thus obtained can be used without purification in the subsequent reaction.

(f) Synthesis of 5-sulfamoylamino-2-hexadecylsulfamoyl-4-amino-1-naphthol

The above-described dye was dissolved in 300 ml of hot water, and hot water containing 40 g of sodium hydrosulfite was added thereto. The color of the solution momentarily disappeared to form an oily precipitate, which was ice-cooled, and the solidified product was collected by filtration. Yield: 10 g (65%)

(g) Synthesis of Compound (3)

10 g of 5-sulfamoylamino-2-hexadecylsulfamoyl-4-amino-1-naphthol and 11.7 g of a dye sulfamoyl chloride were reacted with each other in a mixture of 100 ml of dimethylacetamide (DMAC) and 20 ml of pyridine. After continuing stirring for about 1 hour, the reaction solution was poured into 1 liter of dilute hydrochloric acid, and the crystals thus formed were collected by filtration, dried, and subjected to silica gel column chromatography to purify using a mixed solvent of chloroform-methanol (10:1) as an eluent. Yield: 11.0 g (52%).

REFERENCE EXAMPLE 1

Test of dye-releasing ability

In order to confirm the substantial dye-releasing ability of the compound according to the present invention, Compound (A) according to the present invention and Compound (B) outside the scope of the present invention having no nucleophilic groups were synthesized in an analogous manner to that in Example 1, and the reaction rate was traced with respect to each compound.

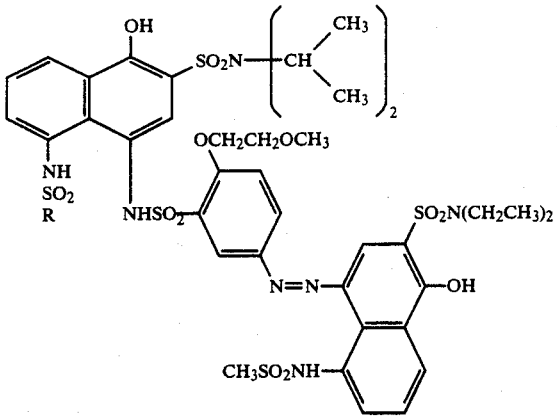

(A): R = $NH_2$
(B): R = $CH_3$ 30 mg of Compounds (A) and (B), respectively, were dissolved in 15 ml of an aqueous solution of pH 9 (buffer solution of pH 9.00) and in 15 ml of 1 N NaOH aqueous solution in a nitrogenous atmosphere while stirring, then 60 mg of manganese dioxide was added thereto to determine a released dye with time. The results thus obtained are shown in Table 1 below, from which it is clear that the compound according to the present invention showed a reaction rate of from 2 to 14 times as fast as that of the compound having no intramolecular nucleophilic groups, with the difference being particularly remarkable in the low pH range.

TABLE I

| | pH 9.00 | 1 N NaOH |
|---|---|---|
| kA | 0.71 $sec^{-1}$ | 0.73 $sec^{-1}$ |
| kB | 0.05 $sec^{-1}$ | 0.34 $sec^{-1}$ |
| kA/kB | 14.2 | 2.15 |

The dye releasing redox compound which releases a diffusible dye according to the present invention can be used in an amount of a fixed range. Generally, a suitable range is about 0.01 mol to about 4 mols of the dye releasing redox compound per mol of the silver halide. A particularly suitable amount in the present invention is in a range of about 0.03 to about 1 mol per mol of the silver halide. When the amount of the dye releasing redox compound is less than about 0.01 per mol of the silver halide, sufficient density cannot be obtained, and when the amount of the dye releasing redox compound is more than about 4 mols, sensitization is decreased because of the color having the dye releasing redox compound per se.

In the present invention, if necessary, a reducing agent may be used. The reducing agent in this case is the so-called auxiliary developing agent, which is oxidized by the silver halide to form its oxidized product having an ability to oxidize the reducing group R in the dye releasing redox compound.

Examples of useful auxiliary developing agents include hydroquinone, alkyl substituted hydroquinones such as tertiary butyl hydroquinone or 2,5-dimethylhydroquinone, catechols, pyrogallols, halogen substituted hydroquinones such as chlorohydroquinone or dichlorohydroquinone, alkoxy substituted hydroquinones such as methoxyhydroquinone, polyhydroxybenzene derivatives such as methyl hydroxynaphthalene, etc. Further, there are methyl gallate, ascorbic acid, ascorbic acid derivatives, hydroxylamines such as N,N'-di(2-ethoxyethyl)hydroxylamine, etc., pyrazolidones such as 1-phenyl-3-pyrazolidone or 4-methyl-4-hydroxymethyl-1-phenyl-3-pyrazolidone, etc., reductones and hydroxy tetronic acids.

The auxiliary developing agent can be used in an amount of a fixed range. A suitable range is 0.01 time by mol to 20 times by mol based on the silver halide. A particularly suitable range is 0.1 time by mol to 4 times by mol.

Examples of the silver halide used in the present invention include silver chloride, silver chlorobromide, silver chloroiodide, silver bromide, silver iodobromide, silver chloroiodobromide and silver iodide, etc.

Particularly preferred examples of silver halide used in the present invention partially contain a silver iodide crystal in its particle. That is, the silver halide the X-ray diffraction pattern of which show that of pure silver iodide are particularly preferred.

The photographic materials comprise a silver halide containing at least two silver halides each having a different halogen. Such silver halides yield a completely mixed crystal in a conventional silver halide emulsion. For example, the particle of silver iodobromide shows X-ray diffraction pattern at a position corresponding to the mixed ratio of silver iodide crystal and silver bromide crystal but not at a position corresponding to pure silver iodide crystal and pure silver bromide crystal separately.

Particularly preferred examples of silver halide used in the present invention include silver chloroiodide, silver iodobromide, and silver chloroiodobromide each containing silver iodide crystal in its particle.

The process for preparing those silver halides is explained taking the case of silver iodobromide. That is, the silver iodobromide is prepared by adding silver nitride solution to potassium bromide solution to form bromide particle and further adding potassium iodide to the mixed crystal.

The silver halide has a particle size of from 0.001 μm to 2 μm and preferably from 0.001 μm to 1 μm.

The silver halide used in the present invention may be used as it is. However, it may be chemically sensitized with a chemical sensitizing agent such as compounds of sulfur, selenium or tellurium, etc., or compounds of gold, platinum, palladium, rhodium or iridium, etc., a reducing agent such as tin halide, etc., or a combination thereof. The details thereof are described in T. H. James, *The Theory of the Photographic Process*, the Fourth Edition, Chapter 5, pages 149 to 169.

Both the silver halide and the dye releasing redox compound may be incorporated into single layer, as well as the silver halide may be incorporated into one layer and the dye releasing redox compound may be incorporated into another layer coated under that layer.

A suitable coating amount of the light-sensitive silver halide used in the present invention is in a total of from 50 mg to 10 g/m$^2$ calculated as an amount of silver.

When an organic silver salt oxidizing agent is used together in the practice of the present invention, the coloring density can be increased and the reaction time can be shortened.

The organic silver salt oxidizing agent which can be used in the present invention is a silver salt which is comparatively stable to light and which forms a silver image by reacting with the above-described dye releasing redox compound or a reducing agent coexisting, if necessary, with dye releasing redox compound, when it is heated to a temperature of above 80° C. and, preferably, above 100° C. in the presence of exposed silver halide.

Examples of these organic silver salt oxidizing agents include the following compounds.

A silver salt of an organic compound having a carboxy group. Typical examples thereof include a silver salt of an aliphatic carboxylic acid and a silver salt of an aromatic carboxylic acid.

Examples of the silver salts of aliphatic carboxylic acids include silver behenate, silver stearate, silver oleate, silver laurate, silver caprate, silver myristate, silver palmitate, silver maleate, silver fumarate, silver tartarate, silver furoate, silver linolate, silver adipate, silver sebacate, silver succinate, silver acetate, silver butyrate and silver camphorate, etc. These silver salts which are substituted with a halogen atom or a hydroxyl group are also effectively used.

Examples of the silver salts of aromatic carboxylic acid and other carboxyl group containing compounds include silver benzoate, a silver substituted benzoate such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenylbenzoate, etc., silver gallate, silver tannate, silver phthalate, silver terephthalate, silver salicylate, silver phenylacetate, silver pyromellitate, a silver salt of 3-carboxymethyl-4-methyl-4-thiazoline-2-thione or the like as described in U.S. Pat. No. 3,785,830, and a silver salt of an aliphatic carboxylic acid containing a thioether group as described in U.S. Pat. No. 3,330,663, etc.

In addition, a silver salt of a compound containing a mercapto group or a thione group and a derivative thereof can be used.

Examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-mercaptobenzothiazole, a silver salt of 2-(S-ethylglycolamido)benzothiazole, a silver salt of thioglycolic acid such as a silver salt of an S-alkyl thioglycolic acid (wherein the alkyl group has from 12 to 22 carbon atoms) as described in Japanese Patent Application (OPI) No. 28221/73, etc., a silver salt of dithiocarboxylic acid such as a silver salt of dithioacetic acid, etc., a silver salt of thioamide, a silver salt of 5-carboxyl-1-methyl-2-phenyl-4-thiopyridine, a silver salt of mercaptototriazine, a silver salt of 2-mercaptobenzoxazole, a silver salt of mercaptooxadiazole, a silver salt as described in U.S. Pat. No. 4,123,274, for example, a silver salt of 1,2,4-mercaptotriazole derivative such as a silver salt of 3-amino-5-benzylthio-1,2,4-triazole, a silver salt of thione compound such as a silver salt of 3-(2-carboxyethyl)-4-methyl-4-thiazoline-2-thione as described in U.S. Pat. No. 3,301,678, etc., and the like.

Further, a silver salt of a compound containing an imino group can be used. Examples of these compounds include a silver salt of benzotriazole and a derivative thereof as described in Japanese Patent Publication Nos. 30270/69 (corresponding to British Pat. No. 1,173,426) and 18416/70 (corresponding to U.S. Pat. No. 3,635,719), for example, a silver salt of benzotriazole, a silver salt of alkyl substituted benzotriazole such as a silver salt of methylbenzotriazole, etc., a silver salt of a halogen substituted benzotriazole such as a silver salt of 5-chlorobenzotriazole, etc., a silver salt of carboimidobenzotriazole such as a silver salt of butylcarboiomidobenzotriazole, etc., a silver salt of 1,2,4-triazole or 1H-tetrazole as described in U.S. Pat. No. 4,220,709, a silver salt of carbazole, a silver salt of saccharin, a silver salt of imidazole and an imidazole derivative, and the like.

Moreover, the organic metal salt oxidizing agent, for example, a silver salt as described in *Research Disclosure,* Vol. 170, No. 17029 (June, 1978) and an organic metal salt such as copper stearate, etc., are also used as an organic silver salt oxidizing agent of the present invention.

The mechanism of the heat-development process under heating in the present invention is not entirely clear, but it is believed to be as follows.

When the photographic material is exposed to light, a latent image is formed in a light-sensitive silver halide. This phenomenon is described in T. H. James, *The Theory of the Photographic Process,* Third Edition, pages 105 to 148.

When the photographic material is heated, the dye releasing redox compound in the case of the present invention reduces the silver halide or the silver halide and the organic silver salt oxidizing agent (when the organic silver salt oxidizing agent is present) in the presence of the latent image nuclei as a catalyst to form metallic silver, while it is oxidized itself. The oxidized product of the dye releasing redox compound is attacked nucleophilically by a nucleophilic group present in its molecule to release a dye.

When the organic silver salt oxidizing agent is used, the silver halide and the organic silver salt oxidizing agent which form a starting point of development should be present within a substantially effective distance.

For this purpose, it is desired that the silver halide and the organic silver salt oxidizing agent are present in the same layer.

The silver halide and the organic metal salt oxidizing agent which are separately formed can be mixed prior to use to prepare a coating solution, but it is also effective to blend both of them in a ball mill for a long period of time. Further, it is effective to use a process which comprises adding a halogen containing compound to the organic silver salt oxidizing agent prepared to form silver halide using silver of the organic silver salt oxidizing agent.

Methods of preparing these silver halide and organic silver salt oxidizing agents and manners of blending them are described in *Research Disclosure,* No. 17029, Japanese Patent Application (OPI) Nos. 32928/75 and 42529/76, U.S. Pat. No. 3,700,458, and Japanese Patent Application (OPI) Nos. 13224/74 and 17216/75.

The organic silver salt oxidizing agent used, if necessary, in the present invention is suitably contained in an amount in the range of from 0.1 mol to 200 mols per mol of the silver halide.

A suitable coating amount of the light-sensitive silver halide and the organic silver salt oxidizing agent employed in the present invention is in a total of from 50 mg to 10 g/m$^2$ calculated as an amount of silver.

The light-sensitive silver halide and the organic silver salt oxidizing agent used in the present invention are prepared in the binder as described below. Further, the dye releasing redox compound is dispersed in the binder described below.

The binder which can be used in the present invention can be employed individually or in a combination of two or more. A hydrophilic binder can be used as the binder according to the present invention. The typical hydrophilic binder is a transparent or translucent hydrophilic colloid, examples of which include a natural substance, for example, protein such as gelatin, a gelatin derivative, a cellulose derivative, etc., a polysaccharide such as starch, gum arabic, etc., and a synthetic polymer, for example, a water-soluble polyvinyl compound such as polyvinyl pyrrolidone, acrylamide polymer, etc. Another example of the synthetic polymer compound is a dispersed vinyl compound in a latex form which is used for the purpose of increasing dimensional stability of a photographic material.

In the heat-developable color photographic material of the present invention, various kinds of dye releasing activators may be used. The dye releasing activator means a substance which attacks nucleophilically the dye releasing redox compound oxidized by the silver halide or the organic silver salt oxidizing agent to release a diffusible dye, and bases, base releasing agents and water releasing compounds are used. In these dye releasing activators, the bases and the base releasing agents are particularly preferred because they not only accelerate release of the dye but also accelerate the oxidation-reduction reaction between the silver halide or the organic silver salt oxidizing agent and the dye releasing redox compound.

Examples of preferred bases are amines which include trialkylamines, hydroxylamines, aliphatic polyamines, N-alklyl substituted aromatic amines, N-hydroxyalkyl substituted aromatic amines and bis[p-(dialkylamino)phenyl]methanes. Further, there are betaine tetramethylammonium iodide and diaminobutane dihydrochloride as described in U.S. Pat. No. 2,410,644, and urea and organic compounds including amino acids such as 6-aminocaproic acid as described in U.S. Pat. No. 3,506,444. The base releasing agent is a substance which releases a basic component by heating. Examples of typical base releasing agent have been described in British Pat. No. 998,949. A preferred base releasing agent is a salt of a carboxylic acid and an organic base, and examples of the suitable carboxylic acid include trichloroacetic acid and trifluoroacetic acid and examples of the suitable base include quanidine, piperidine, morpholine, p-toluidine and 2-picoline, etc. Guanidien trichloroacetate as described in U.S. Pat. No. 3,220,846 is particularly preferred. Further, aldonic amides as described in Japanese Patent Application (OPI) No. 22625/75 are suitably used because they decompose at a high temperature to form a base.

The water releasing compound means a compound which releases water by decomposition during heat development to convert into a compound having a vapor pressure of $10^{-5}$ Torr or more at a temperature of 100° to 200° C. These compounds are known in the field of printing of fabrics, and $NH_4Fe(SO_4)_2.12H_2O$, etc., as described in Japanese Patent Application (OPI) No. 88386/75 are useful.

These dye releasing activator can be used in an amount of a broad range. It is preferably used in an amount in the range of 1/100 to 10 times and, preferably, 1/20 to 2 times by molar ratio based on silver.

Further, in the heat-developable color photographic material of the present invention, it is possible to use compounds which activate development and simultaneously stabilize the images. Particularly, it is suitable to use isothiuroniums including 2-hydroxyethylisothiuronium trichloroacetate as described in U.S. Pat. No. 3,301,678, bisisothiuroniums including 1,8-(3,6-dioxaoctane)-bis(isothiuronium.trifluoroacetate), etc., as described in U.S. Pat. No. 3,669,670, thiol compounds as described in German Patent Application (OLS) No. 2,162,714, thiazolium compounds such as 2-amino-2-thiazolium.trichloroacetate, 2-amino-5-bromoethyl-2-thiazolium.trichloroacetate, etc., as described in U.S. Pat. No. 4,012,260, compounds having α-sulfonylacetate as an acid part such as bis(2-amino-2-thiazolium)-methylene-bis(sulfonylacetate), 2-amino-2-thiazolium phenylsulfonylacetate, etc., as described in U.S. Pat. No. 4,060,420, and compounds having 2-carboxycarboxamide as an acid part as described in U.S. Pat. No. 4,088,496.

These compounds or mixtures thereof can be used in a wide range of amounts. It is preferable to use them in a range of 1/100 to 10 times and, preferably, 1/20 to 2 times by molar ratio based on silver.

In the heat-developable color photographic material of the present invention, it is possible to use a thermal solvent. The term "thermal solvent" means a non-hydrolyzable organic material which is solid at an ambient temperature but melts together with other components at a temperature of heat treatment or below. Preferred examples of thermal solvents include compounds which can act as a solvent for the developing agent and compounds having a high dielectric constant which accelerate physical development of silver salts. Examples of preferred thermal solvents include polyglycols as described in U.S. Pat. No. 3,347,675, for example, polyethylene glycol having an average molecular weight of 1,500 to 20,000, derivatives of polyethylene oxide such as oleic acid ester, etc., beeswax, monostearin, compounds having a high dielectric constant which have —$SO_2$— or —CO— such as acetamide, succinimide, ethylcarbamate, urea, methylsulfonamide, ethylene carbonate, etc., polar substances as described in U.S. Pat. No. 3,667,959, lactone of 4-hydroxybutanoic acid, methylsulfinylmethane, tetrahydrothiophene-1,1-dioxide, and 1,10-decanediol, methyl anisate and biphenyl suberate as described in *Research Disclosure*, pages 26 to 28 (December, 1976), etc.

In the present invention, though it is not necesssary to incorporate substances or dyes for preventing irradiation or halation in the photographic material, because the photographic material is colored by the dye releasing redox compound, it is possible to add filter dyes or light absorbent materials, etc., as described in Japanese Patent Publication No. 3692/73, U.S. Pat. Nos. 3,253,921, 2,527,583 and 2,956,879, etc., in order to further improve sharpness. It is preferred that these dyes have a thermal bleaching property. For example, dyes as described in U.S. Pat. Nos. 3,769,019, 3,745,009 and 3,615,432 are preferred.

The photographic material according to the present invention may contain, if necessary, various additives known for the heat-developable photographic materials and may have a layer other than the light-sensitive layer, for example, an antistatic layer, an electrically conductive layer, a protective layer, an intermediate layer, an antihalation layer and a strippable layer, etc. Examples of additives include those described in *Research Disclosure,* Vol. 170, No. 17029 (June, 1978), for example, plasticizers, dyes for improving sharpness, antihalation dyes, sensitizing dyes, matting agents, surface active agents, fluorescent whitening agents and fading preventing agents, etc.

The protective layer, the intermediate layer, the subbing layer, the back layer and other layers can be produced by preparing each coating solution and applying to a support by various coating methods such as a dip coating method, an air-knife coating method, a curtain coating method or a hopper coating method as described in U.S. Pat. No. 2,681,294 and drying in a similar manner to preparing the heat-developable photographic layer of the present invention, by which the photographic material is obtained.

If necessary, two or more layers may be applied at the same time by the method as described in U.S. Pat. No. 2,761,791 and British Pat. No. 837,095.

Various means of exposure can be used in connection with the heat-developable photographic material of the present invention. Latent images are obtained by imagewise exposure by radiant rays including visible rays. Generally, light sources used for conventional color prints can be used, examples of which include tungsten lamps, mercury lamps, halogen lamps such as iodione lamps, xenon lamps, laser light sources, CRT light sources, fluorescent tubes and light-emitting diodes, etc.

The original may be line drawings or photographs having gradation. Further, it is possible to take a photograph of a portrait or landscape by means of a camera. Printing form the original may be carried out by contact printing by putting the original in close contact with the material or may be carried out by reflection printing or enlargement printing.

It is also possible to carry out the printing of images photographed by a videocamera or image informations sent from a television broadcasting station by displaying on a cathode ray tube (CRT) or a fiber optical tube (FOT) and focusing the resulting image on the heat-developable photographic material by contacting therewith or by means of a lens.

Recently, light-emitting diode (LED) systems which have been greatly improved have begun to be utilized as an exposure means or display means for various apparatus and devices. It is difficult to produce an LED which effectively emits blue light. In this case, in order to reproduce the color image, three kinds of LEDs consisting of those emitting each green light, red light and infrared light are used. The photographic material to be sensitized by these lights is produced so as to release a yellow dye, a magenta dye and a cyan dye, respectively.

The photographic material is produced using a construction such that the green-sensitive part (layer) contains a yellow dye releasing compound, the red-sensitive part (layer) contains a magenta dye releasing compound and the infrared-sensitive part (layer) contains a cyan dye releasing compound. Other combinations can be utilized, if necessary.

In addition to the above-described methods of contacting or projecting the original, there is a method of exposure wherein the original illuminated by a light source is stored in a memory of a leading computer by means of a light-receiving element such as a phototube or a charge coupling device (CCD). The resulting information is, if necessary, subjected to processing, the so-called image treatment, and resulting image information is reproduced on CRT which can be utilized as an image-like light source or lights are emitted by three kinds of LED according to the processed information.

After the heat-developable color photographic material is exposed to light, the resulting latent image can be developed by heating the whole material to a suitably elevated temperature, for example, about 80° C. to about 250° C. for about 0.5 second to about 300 seconds. A higher temperature or lower temperature can be utilized to prolong or shorten the heating time, if it is within the above-described temperature range. Particularly, a temperature range of about 110° C. to about 160° C. is useful. As the heating means, a simple heat plate, iron, heat roller or analogues thereof may be used.

In the present invention, a specific method for forming a color image by heat development comprises heat diffusion transfer of a hydrophilic diffusible dye. For this purpose, the heat-developable color photographic material is composed of a support having thereon a light-sensitive layer (I) containing at least silver halide, an organic silver salt oxidizing agent (if necessary), a dye releasing redox compound which is also a reducing agent for the silver halide and/or the organic silver salt oxidizing agent and a hydrophilic binder, and an image receiving layer (II) capable of receiving the hydrophilic diffusible dye formed in the light-sensitive layer (I).

A dye releasing activator may not be used or may be incorporated either into the light-sensitive layer (I) or into the image receiving layer (II). The dye releasing activator may be provided from outside, if necessary.

The above-described light-sensitive layer (I) and the image receiving layer (II) may be formed on the same support, or they may be formed on different supports, respectively. The image receiving layer (II) can be stripped off the light-sensitive layer (I). For example, after the heat-developable color photographic material is exposed imagewise to light, it is developed by heating uniformly and thereafter the image receiving layer (II) is peeled apart.

In accordance with another process, after the heat-developable color photographic material is exposed imagewise to light and developed by heating uniformly, the dye can be transferred on the image receiving layer (II) by superposing the image receiving layer on the light-sensitive layer (I) and heating to a temperature lower than the developing temperature. The temperature lower than the developing temperature in such a case includes room temperature and preferably a temperature from room temperature to a temperature not less than about 40° C. lower than the heat-developing temperature. For example, a heat-developing temperature and a transferring temperature are 120° C. and 80° C., respectively. Further, there is a method wherein only the light-sensitive layer (I) is exposed imagewise to light and then developed by heating uniformly by superposing the image receiving layer (II) on the light-sensitive layer (I).

The image receiving layer (II) can contain a dye mordant. In the present invention, various mordants can be used, and a useful mordant can be selected according to properties of the dye, conditions for transfer, and other components contained in the photographic material, etc. The mordants which can be used in the present invention include high molecular weight polymer mordants.

Polymer mordants to be used in the present invention are polymers containing secondary and tertiary amino groups, polymers containing nitrogen-containing hetero ring moieties, polymers having quaternary cation groups thereof, having a molecular weight of from 5,000 to 200,000, and particularly from 10,000 to 50,000.

For example, there are illustrated vinylpyridine polymers and vinylpyridinium cation polymers as disclosed in U.S. Pat. Nos. 2,548,564, 2,484,430, 3,148,061 and 3,756,814, etc., polymer mordants capable of cross-linking with gelatin, etc., as disclosed in U.S. Pat. Nos. 3,625,694, 3,859,096 and 4,128,538, British Pat. No. 1,277,453, etc., aqueous sol type mordants as disclosed in U.S. Pat. Nos. 3,958,995, 2,721,852 and 2,798,063, Japanese Patent Application (OPI) Nos. 115228/79, 145529/79 and 126027/79, etc., water-insoluble mordants as disclosed in U.S. Pat. No. 3,898,088, etc., reactive mordants capable of forming covalent bonds with dyes used as disclosed in U.S. Pat. No. 4,168,976 (Japanese Patent Application (OPI) No. 137333/79), etc., and mordants disclosed in U.S. Pat. Nos. 3,709,690, 3,788,855, 3,642,482, 3,488,706, 3,557,066, 3,271,147 and 3,271,148, Japanese Patent Application (OPI) Nos. 71332/75, 30328/78, 155528/77, 125/78 and 1024/78, etc.

In addition, mordants disclosed in U.S. Pat. Nos. 2,675,316 and 2,882,156 can be used.

Of these mordants, those which migrate with difficulty from a mordanting layer to other layers are preferable; for example, mordants capable of cross-linking with a matrix such as gelatin, water-insoluble mordants, and aqueous sol (or latex dispersion) type mordants are preferably used.

Particularly preferable polymer mordants are described below.

(1) Polymers having quaternary ammonium groups and groups capable of forming covalent bonds with gelatin (for example, aldehydo groups, chloroalkanoyl groups, chloroalkyl groups, vinylsulfonyl groups, pyridiniumpropionyl groups, vinylcarbonyl groups, alkylsulfonoxy groups, etc.), such as

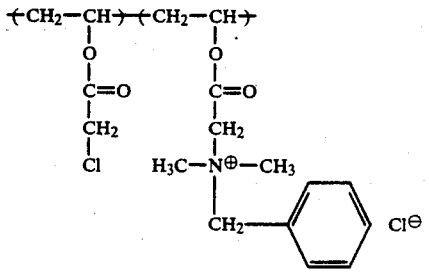

(2) Reaction products between a copolymer of a monomer represented by the following general formula with another ethylenically unsaturated monomer and a cross-linking agent (for example, bisalkanesulfonate, bisarenesulfonate, etc.):

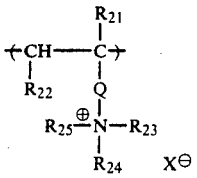

wherein $R_{21}$ represents H or an alkyl group, $R_{22}$ represents H, an alkyl group or an aryl group, Q represents a divalent group, $R_{23}$, $R_{24}$ and $R_{25}$ each represents an alkyl group, an aryl group or at least two or $R_{23}$ to $R_{25}$ are bonded together to form a hetero ring, and X represents an anion. The above-described alkyl groups and aryl groups may be substituted.

(3) Polymers represented by the following general formula

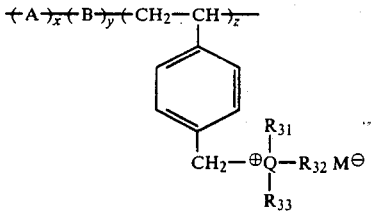

wherein x is from about 0.25 mol % to about 5 mol %, y is from about 0 mol % to about 90 mol %, z is from about 10 mol % to about 99 mol %, A represents a monomer having at least two ethylenically unsaturated bonds, B represents a copolymerizable ethylenically unsaturated monomer, Q represents N or P, $R_{31}$, $R_{32}$ and $R_{33}$ each represents an alkyl group or a cyclic hydrocarbon group or at least two of $R_{31}$ to $R_{33}$ are bonded together to form a ring (these groups and rings may be substituted), and M represents an anion.

(4) Copolymers composed of (a), (b) and (c), wherein (a) is

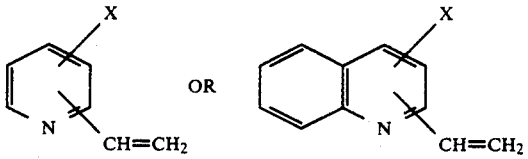

wherein X represents a hydrogen atom, an alkyl group or a halogen atom (the alkyl group may be substituted);

(b) is an acrylic ester; and (c) is acrylonitrile.

(5) Water-insoluble polymers wherein at least ⅓ of the repeating units are those represented by the following general formula

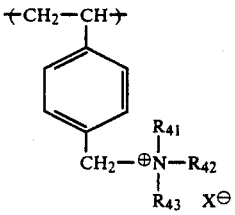

wherein $R_{41}$, $R_{42}$ and $R_{43}$ each represents an alkyl group, with the total number of carbon atoms being 12 or more (the alkyl group may be substituted), and X represents an anion.

Various kinds of known gelatins can be employed as gelatin for the mordant layer. For example, gelatin for the mordant layer. For example, gelatin which is produced in a different manner such as lime-processed gelatin, acid-processed gelatin, etc., or a gelatin derivative which is prepared by chemically modifying gelatin such as phthalated gelatin, sulfonylated gelatin, etc., can be used. Also, gelatin subjected to a desalting treatment can be used, if desired.

The ratio of polymer mordant to gelatin and the amount of the polymer mordant coated can be easily determined by one skilled in the art depending on the amount of the dye to be mordanted, the type and composition of the polymer mordant and further on the image-forming process used. Preferably, the ratio of mordant to gelatin is from about 20/80 to 80/20 (by weight) and the amount of the mordant coated is from 0.5 to 8 g/m$^2$.

The image receiving layer (II) can have a white reflective layer. For example, a layer of titanium dioxide dispersed in gelatin can be provided on the mordant layer on a transparent support. The layer of titanium dioxide forms a white opaque layer, by which reflection color images of the transferred color images which are observed through the transparent support are obtained.

Typical image receiving materials for diffusion transfer are obtained by mixing the polymer containing ammonium salt groups with gelatin and applying the mixture to a transparent support.

The transfer of dyes from the photographic light-sensitive layer to the image receiving layer can be carried out using a transfer solvent. Examples of useful transfer solvents include water and an alkaline aqueous solution containing sodium hydroxide, potassium hydroxide and an inorganic alkali metal salt. Further, an organic solvent having a low boiling point such as methanol, N,N-dimethylformamide, acetone, diisobutyl ketone, etc., and a mixture of such an organic solvent having a low boiling point with water or an alkaline aqueous solution can be used. The transfer solvent can be employed by wetting the image receiving layer with the transfer solvent or by incorporating it in the form of water of crystallization or microcapsules into the photographic material.

The present invention will be explained in greater detail with reference to the following examples, but the present invention should not be construed as being limited thereto.

EXAMPLE 1

40 g of gelatin and 26 g of potassium bromide were dissolved in 3,000 ml of water and the solution was stirred while maintaining the temperature at 50° C. A solution containing 34 g of silver nitrate dissolved in 200 ml of water was added to the above-described solution over a period of 10 minutes. Then, a solution containing 3.3 g of potassium iodide dissolved in 100 ml of water was added for a period of 2 minutes. By controlling the pH of the silver iodobromide emulsion thus prepared precipitate was formed and the excess salts were removed. The pH of the emulsion was then adjusted to 6.0 and 400 g of the silver iodobromide emulsion was obtained.

In the following, a method of preparing a gelatin dispersion of a dye releasing redox compound is described.

A mixture of 11 g of Dye Releasing Redox Compound (3), 0.5 g of sodium 2-ethylhexylsulfosuccinate, 20 g of tricresyl phosphate (TCP) and 20 ml of cyclohexanone was heated at about 60° C. to form a solution. The solution was mixed with 100 g of a 10% aqueous solution of gelatin and then dispersed using a homogenizer at 10,000 rpm for 10 minutes. The dispersion thus prepared is designated a dispersion of a dye releasing redox compound.

In the following, a method of preparing a light-sensitive coating is described.

| | | |
|---|---|---|
| (a) | a silver iodobromide emulsion described above | 5 g |
| (b) | a dispersion of a dye releasing redox compound | 3.5 g |

The above described components (a) and (b) and 4 ml of water were mixed and dissolved by heating. The solution was coated on a polyethylene terephthalate film at a wet thickness of 60 μm and dried. The sample thus prepared was exposed imagewise at 2,000 lux for 10 seconds using a tungsten lamp and then uniformly heated on a heat block for 30 seconds which had been heated at 100° C.

In the following, a method of preparing an image receiving material having an image receiving layer is described.

10 g of a copolymer of methyl acrylate and N,N,N-trimethyl-N-vinylbenzyl ammonium chloride (a ratio of methyl acrylate and vinyl benzyl ammonium chloride being 1:1) was dissolved in 200 ml of water and the solution was uniformly mixed with 100 g of a 10% aqueous solution of lime-processed gelatin. The mixture was uniformly coated on a polyethylene terephthalate film at a wet thickness of 20 μm and dried to prepare an image receiving material.

The image receiving material was soaked in water and superposed on the heated photographic light-sensitive material described above in order to bring them into contact with each of the surface layers. After 30 seconds, the image receiving material was peeled apart from the photographic light-sensitive material to obtain a negative magenta color image on the image receiving material. The optical density of the negative image was measured using a Macbeth transmission densitometer (TD-504). The maximum density and the minimum density to green light was 1.45 and 0.25, respectively. Further, the gradation of the sensitometric curve showed a density difference of 0.95 to an exposure difference of 10 times in the straight line part.

EXAMPLE 2

A dispersion of a dye releasing redox compound was prepared in the same manner as described in Example 1 except adding 0.4 g of 1-phenyl-4-methyl-4-hydroxymethyl-3-pyrazolidone to 11 g of Dye Releasing Redox Compound (3). The same procedure and process as described in Example 1 were repeated except using the dispersion described above. As a result, a negative magenta image having the maximum density of 1.65 and the minimum density of 0.28 was obtained.

EXAMPLE 3

6.5 g of benzotriazole and 10 g of gelatin were dissolved in 1,000 ml of water and the solution was stirred while maintaining the temperature at 50° C. A solution containing 8.5 g of silver nitrate dissolved in 100 ml of water was added to the above-described solution over a period of 2 minutes. Then, a solution containing 1.2 g of potassium bromide dissolved in 50 ml of water was added over a period of 2 minutes. By controlling the pH of the emulsion thus prepared precipitate was formed and excess salts were removed. The pH of the emulsion was then adjusted to 6.0 and 200 g of the emulsion was obtained.

A light-sensitive coating was prepared in the same procedure as described in Example 1 except using the following components:

| | | |
|---|---|---|
| (a) | a silver benzotriazole emulsion containing a light-sensitive silver bromide | 10 g |
| (b) | a dispersion of a dye releasing compound as described in Example 2 | 3.5 g |
| (c) | water | 2 ml |

Then, the same procedure and process as described in Example 1 were carried out. As a result, a negative magenta image having the maximum density of 1.80 and the minimum density of 0.28 was obtained.

EXAMPLE 4

The same procedure and process as described in Example 1 were repeated except adding a solution containing 0.2 g of guanidine trichloroacetate dissolved in 2 ml of methanol to a light-sensitive coating. As a result, a negative magenta image having the maximum density of 2.02 and the minimum density of 0.33 was obtained.

EXAMPLE 5

The same procedure and process as described in Example 1 were repeated except using Dye Releasing Redox Compound (10) in place of Dye Releasing Redox Compound (3). As a result, a magenta color image having the maximum density of 2.20 and the minimum density of 0.38 was obtained.

EXAMPLE 6

An emulsion was prepared using 3-amino-5-benzylthio-1,2,4-triazole in the following manner. 14 g of gelatin and 11.3 g of 3-amino-5-benzylthio-1,2,4-triazole were dissolved in a mixture of 1,000 ml of water and 300 ml of methanol. The solution was maintained at 50° C. with stirring to which a solution containing 8.5 g of silver nitrate dissolved in 50 ml of water was added for a period of 5 minutes. After standing for 5 minutes, a solution containing 1.2 g of potassium bromide dissolved in 50 ml of water was added for a period of 5 minutes. The temperature of the solution was decreased to 40° C. and the undesirable salts were removed by a flocculation method to obtain 200 g of the emulsion.

The same procedure and process as described in Example 3 were repeated except using 10 g of the silver 3-amino-5-benzylthio-1,2,4-triazole emulsion containing a light-sensitive silver bromide described above. As a result, a negative magenta color image having the maximum density of 1.75 and the minimum density of 0.26 was obtained on the image receiving material.

While the invention has been described in detail and with reference to specific embodiments thereof, it will be apparent to one skilled in the art that various changes and modifications can be made therein without departing from the spirit and scope thereof.

What is claimed is:

1. A heat-developable color photographic material, comprising:

a support having thereon:

a light-sensitive silver halide;

a hydrophilic binder; and a dye releasing redox compound represented by the following general formula (I):

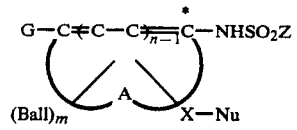

(I)

wherein G represents —OR[1] or —NHR[2]; R[1] represents a hydrogen atom or a hydrolyzable group; R[2] represents a hydrogen atom or an alkyl group containing from 1 to 50 carbon atoms; Z represents an image forming dye group; A represents one or more carbon atoms nitrogen atoms, and/or oxygen atoms necessary for forming a substituted or unsubstituted aromatic ring; Ball represents an organic immobilizing group bound directly or through a linking group to the aromatic ring, and when two Ball groups exist, they may be the same or different from each other; m represents an integer of 1 or 2; X represents a divalent organic group containing from 1 to 8 atoms and X with a nucleophilic group (Nu) is capable of forming a 5- to 12-membered ring together with an electrophilic center (the carbon atom marked with *) which is formed by oxidation; Nu represents a nucleophilic group; and n represents an integer of 1 or 2, said dye-releasing redox compound providing a color image of high density.

2. A heat-developable color photographic material as claimed in claim 1, wherein the aromatic ring formed with A has a substituent selected from an alkyl group, an alkoxy group, a substituted alkoxy group, an acylamino group, a carbamoyl group, a sulfonamido group, a sulfamoyl group, an acyl group, a nitro group, a cyano group or a halogen atom.

3. A heat-developable color photographic material as claimed in claim 1, wherein the divalent organic group represented by X is a $C_1$–$C_8$ methylene group, an oxamethylene group, an aminomethylene group, a sulfonyl group, a carbonyl group, an amido group, a carbamoyl group, a sulfonamido group, a sulfamoyl group or a phenylene group.

4. A heat-developable color photographic material as claimed in claim 1, wherein the nucleophilic group represented by Nu is a hydroxy group, an amino group, a carboxylic acid group, a sulfonic acid group or a precursor thereof.

5. A heat-developable color photographic material as claimed in claim 1, wherein the ballast group represented by Ball is a hydrophobic group containing from 8 to 50 carbon atoms.

6. A heat-developable color photographic material as claimed in claim 1, wherein the ballast group is bonded to the redox portion of the compound directly or through a linking group selected from an imino bond, an ether bond, a thioether bond, a carbonamido bond, a sulfonamido bond, a ureido bond, an ester bond, an imido bond, a carbamoyl bond, a sulfamoyl bond or a combination thereof.

7. A heat-developable color photographic material as claimed in claim 5, wherein the ballast group is selected from the following general formulae:

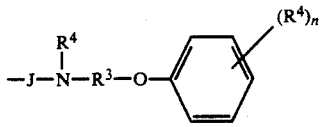
(1)

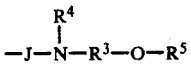
(2)

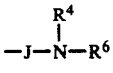
(3)

(4)

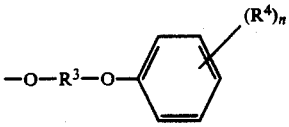
(5)

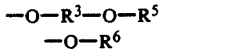
(6)

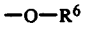
(7)

wherein J represents —CO— or —$SO_2$—, $R^3$ represents an alkylene group containing from 1 to 10 carbon atoms, $R^4$ represents a hydrogen atom or an alkyl group containing from 1 to 30 carbon atoms, n represents an integer of 1 to 5, $R^5$ represents an alkyl group containing from 4 to 30 carbon atoms, and $R^6$ represents an unsubstituted alkyl group containing from 8 to 30 carbon atoms or a substituted alkyl group containing in total 8 or more carbon atoms.

8. A heat-developable color photographic material as claimed in claim 1, wherein the dye releasing redox compound is represented by the following general formula (II):

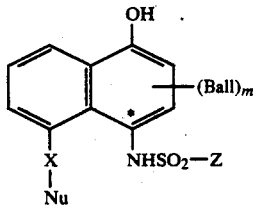
(II)

wherein Z, X, Nu, Ball and m each has the same meaning as defined in the general formula (I).

9. A heat-developable color photographic material as claimed in claim 1, wherein the dye releasing redox compound is represented by the following general formula (III):

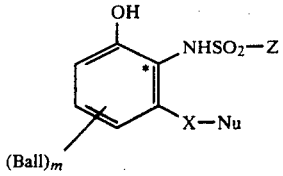
(III)

wherein Z, X, Nu, Ball and m each has the same meaning as defined in the general formula (I).

10. A heat-developable color photographic material as claimed in claim 1, wherein the dye which can be used for image forming dye group represented by Z includes an azo dye, an azomethine dye, an anthraquinone dye, a naphthoquinone dye, a styryl dye, a nitro dye, a quinoline dye, a carbonyl dye or a phthalocyanine dye.

11. A heat-developable color photographic material as claimed in claim 10, wherein the dye included in the image forming dye group represented by Z is represented by the following general formulae:

Yellow

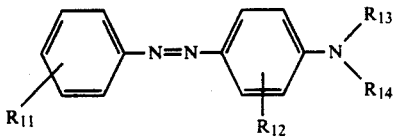
(1)

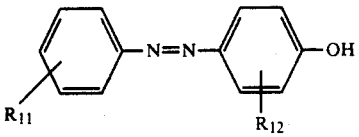
(2)

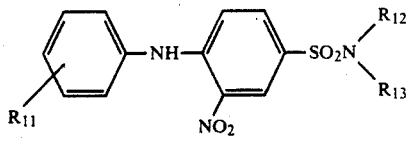
(3)

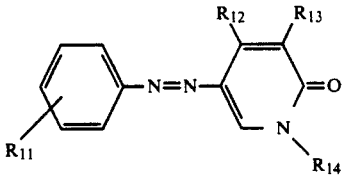
(4)

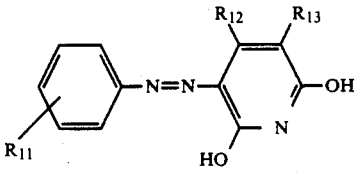
(5)

-continued
(6)
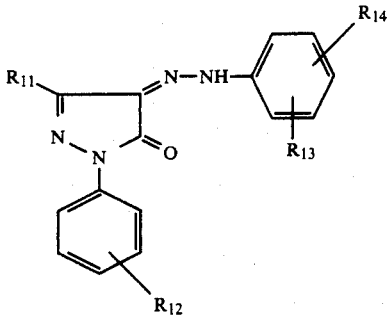
(7)
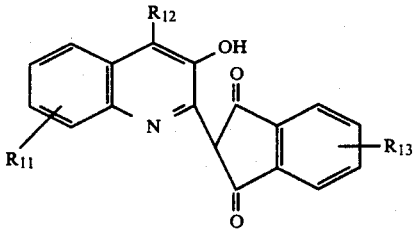
(8)
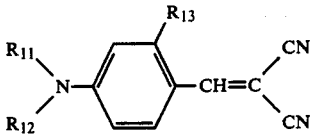
(9)
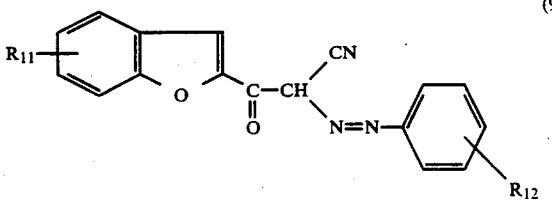
(10)
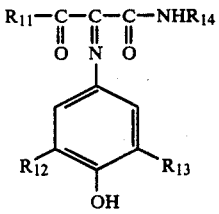
Magenta
(11)
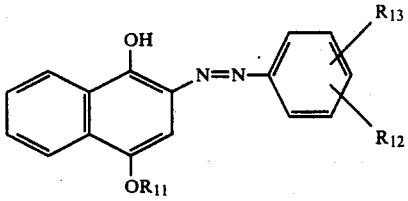
(12)
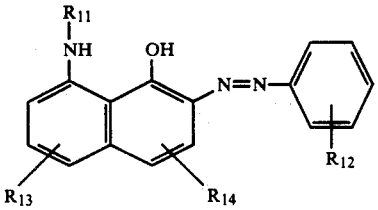
-continued
(13)
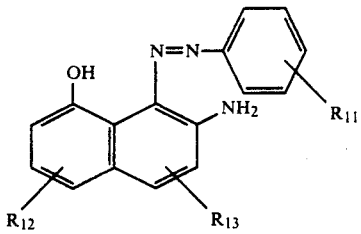
(14)
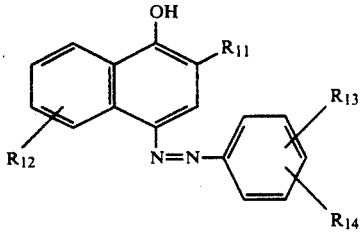
(15)
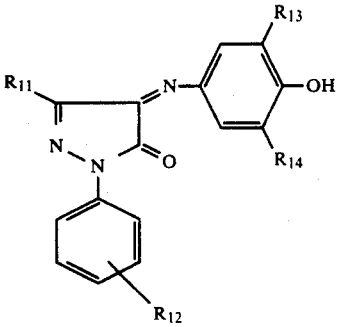
(16)
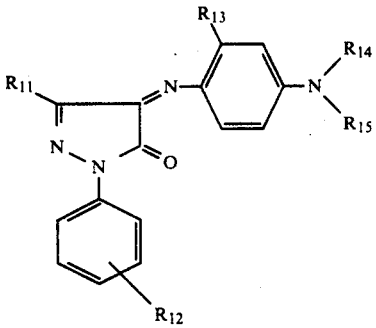
(17)
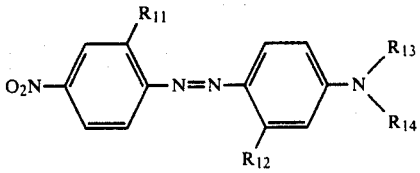
(18)
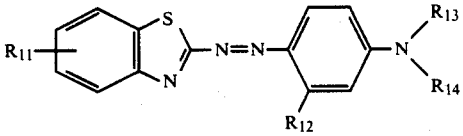
(19)
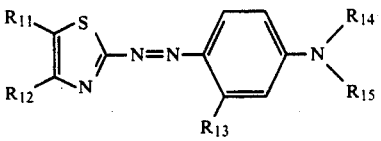

-continued
(20)
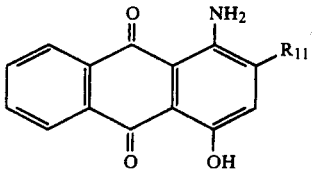
(21)
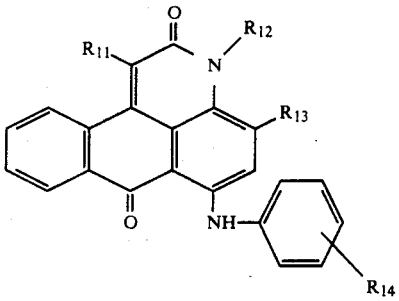
(22)
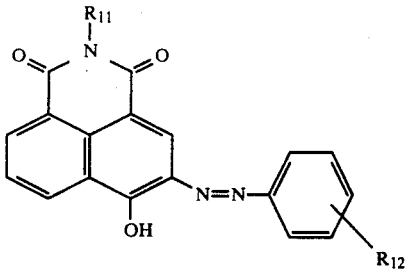
Cyan
(23)
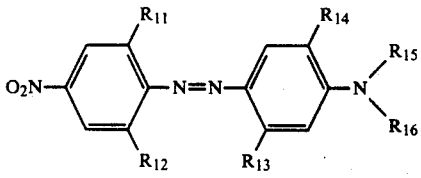
(24)
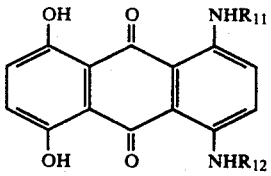
(25)
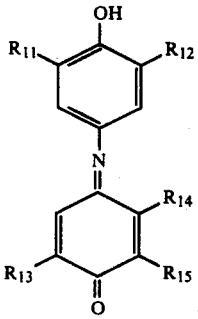
-continued
(26)
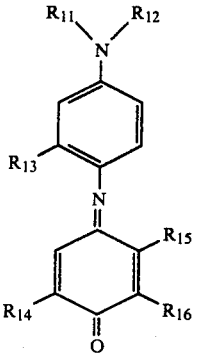
(27)
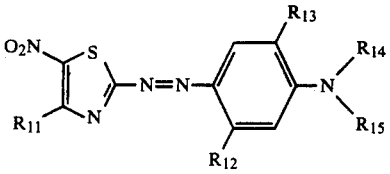
(28)
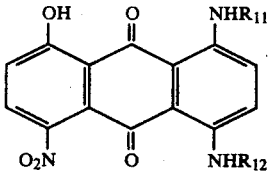
(29)
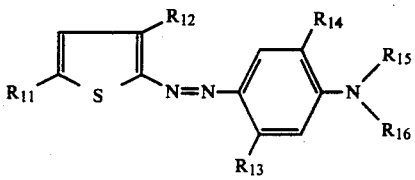
(30)
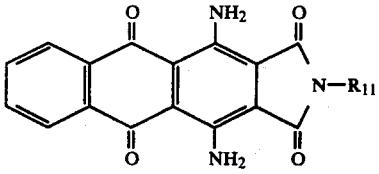
(31)
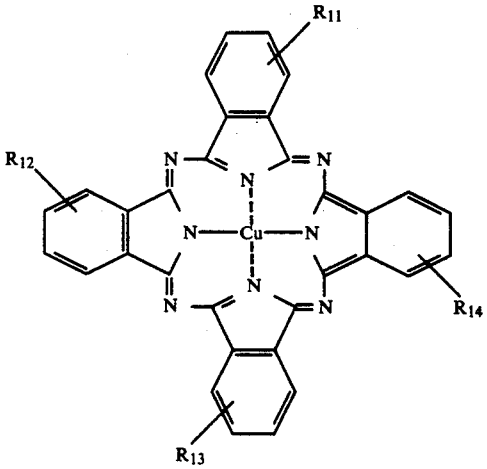

-continued (32)

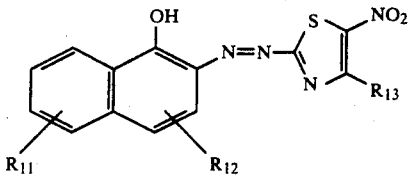

(33)

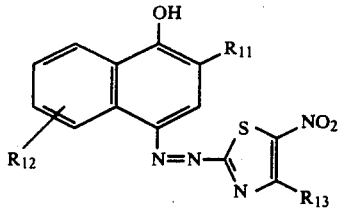

(34)

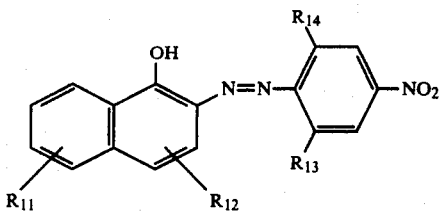

(35)

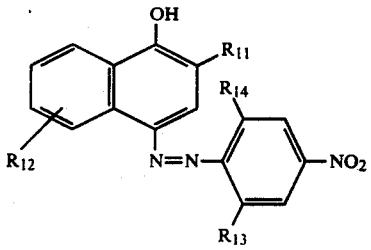

wherein $R_{11}$ to $R_{16}$, which may be the same or different, each represents a hydrogen atom or a substituent selected from an alkyl group, a cycloalkyl group, an aralkyl group, an alkoxy group, an aryloxy group, an aryl group, an acylamino group, an acyl group, a cyano group, a hydroxy group, an alkylsulfonylamino group, an arylsulfonylamino group, an alkylsulfonyl group, a hydroxyalkyl group, a cyanoalkyl group, an alkoxycarbonyoalkyl group, an alkoxyalkyl group, an aryloxyalkyl group, a nitro group, a halogen atom, a sulfamoyl group, an N-substituted sulfamoyl group, a carbamoyl group, an N-substituted carbamoyl group, an acyloxyalkyl group, an amino group, a substituted amino group, an alkylthio group or an arylthio group.

12. A heat-developable color photographic material as claimed in claim 11, wherein the alkyl moiety and the aryl moiety in the substituent for $R_{11}$ to $R_{16}$ is further substituted with a halogen atom, a hydroxy group, a cyano group, an acyl group, an acylamino group, an alkoxy group, a carbamoyl group, a substituted carbamoyl group, a sulfamoyl group, a substituted sulfamoyl group, a carboxy group, an alkylsulfonylamino group, an arylsulfonylamino group or a ureido group.

13. A heat-developable color photographic material as claimed in claim 1, wherein a dye included in the image forming dye group represented by Z has a hydrophilic group selected from a hydroxy group, a carboxy group, a sulfo group, a phosphoric acid group, an imido group, a hydroxamic acid group, a quaternary ammonium group, a carbamoyl group, a substituted carbamoyl group, a sulfamoyl group, a substituted sulfamoyl group, a sulfamoylamino group, a substituted sulfamoylamino group, a ureido group, a substituted ureido group, an alkoxy group, a hydroxyalkoxy group, or an alkoxyalkoxy group.

14. A heat-developable color photographic material as claimed in claim 13, wherein the hydrophilic group is a phenolic hydroxy group, a carboxy group, a sulfo group, a phosphoric acid group, an imido group, a hydroxamic acid group, a sulfamoyl group which may be substituted or a sulfamoylamino group which may be substituted.

15. A heat-developable color photographic material as claimed in claim 1, wherein an amount of the dye releasing redox compound is from 0.01 mol to 4 mols per mol of the silver halide.

16. A heat-developable color photographic material as claimed in claim 1, wherein the color photographic material further contains a reducing agent.

17. A heat-developable color photographic material as claimed in claim 16, wherein the reducing agent is an auxiliary developing agent.

18. A heat-developable color photographic material as claimed in claim 17, wherein an amount of the auxiliary developing agent is from 0.01 time to 20 times by mol based on the silver halide.

19. A heat-developable color photographic material as claimed in claim 1, wherein the light-sensitive silver halide is silver chloride, silver chlorobromide, silver chloroiodide, silver bromide, silver iodobromide, silver chloroiodobromide or silver iodide.

20. A heat-developable color photographic material as claimed in claim 1, wherein the light-sensitive silver halide is silver chloroiodide, silver iodobromide or silver chloroiodobromide each containing silver iodide crystal in its particle.

21. A heat-developable color photographic material as claimed in claim 1, wherein the particle size of the silver halide is from 0.001 μm to 2 μm.

22. A heat-developable color photographic material as claimed in claim 1, wherein the color photographic material further contains an organic silver salt oxidizing agent.

23. A heat-developable color photographic material as claimed in claim 22, wherein the organic silver salt oxidizing agent is a silver salt which forms silver by reacting with the dye releasing redox compound, when it is heated to a temperature of above 80° C. in the presence of exposed silver halide.

24. A heat-developable color photographic material as claimed in claim 22, wherein the organic silver salt oxidizing agent is a silver salt of an organic compound having a carboxy group, a silver salt of a compound containing a mercapto group or a thione group or a silver salt of a compound containing an imino group.

25. A heat-developable color photographic material as claimed in claim 22, wherein the organic silver salt oxidizing agent is a silver salt of carboxylic acid derivatives or N-containing heterocyclic compounds.

26. A heat-developable color photographic material as claimed in claim 22, wherein the organic silver salt oxidizing agent is present in a range from 0.1 mol to 200 mols per mol of the light-sensitive silver halide.

27. A heat-developable color photographic material as claimed in claim 22, wherein the light-sensitive silver halide and the organic silver salt oxidizing agent are present in the same layer.

28. A heat-developable color photographic material as claimed in claim 1, wherein the hydrophilic binder is gelatin or a gelatin derivative.

29. A heat-developable color photographic material as claimed in claim 1, wherein the color photographic material further contains a dye releasing activator.

30. A heat-developable color photographic material as claimed in claim 29, wherein the dye releasing activator is a substance which attacks nucleophilically a dye releasing redox compound oxidized by a silver halide or an organic silver salt oxidizing agent to release a diffusible dye.

31. A heat-developable color photographic material as claimed in claim 29, wherein the dye releasing activator is a base, a base releasing agent or a water releasing compound.

32. A heat-developable color photographic material as claimed in claim 29, wherein an amount of the dye releasing activator is from 1/100 time to 10 times by molar ratio based on silver.

33. A heat-developable color photographic material as claimed in claim 1, wherein the color photographic material further contains a thermal solvent.

34. A heat-developable color photographic material as claimed in claim 1, wherein the color photographic material further comprises an image receiving layer capable of receiving a hydrophilic diffusible dye.

35. A heat-developable color photographic material as claimed in claim 34, wherein the image receiving layer contains a dye mordant.

36. A heat-developable color photographic material as claimed in claim 34, wherein the image receiving layer contains a polymer mordant and gelatin.

37. A heat-developable color photographic material as claimed in claim 1, wherein the color photographic material further contains a transfer solvent.

38. A heat-developable color photographic material as claimed in claim 37, wherein the transfer solvent is water, an alkaline aqueous solution, an organic solvent having a low boiling point or a mixture thereof.

39. A heat-developable color photographic material as claimed in claim 1, wherein the light-sensitive silver halide is present in a total amount of from 50 mg to 10 $g/m^2$.

40. A method for forming a color image, comprising the steps of:

providing a heat-developable color photographic material comprised of a support having thereon a light-sensitive silver halide, a hydrophilic binder and a dye releasing redox compound represented by the general formula (I):

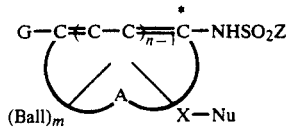

(I)

wherein G represents —$OR^1$ or —$NHR^2$; $R^1$ represents a hydrogen atom or a hydrolyzable group; $R^2$ represents a hydrogen atom or an alkyl group containing from 1 to 50 carbon atoms; Z represents an image forming dye group; A represents one or more carbon atoms nitrogen atoms, and/or oxygen atoms necessary for forming a substituted or unsubstituted aromatic ring; Ball represents an organic immobilizing group bound directly or through a linking group to the aromatic ring, and when two Ball groups exist, they may be the same or different from each other; m represents an integer of 1 or 2; X represents a divalent organic group containing from 1 to 8 atoms and X with a nucleophilic group (Nu) is capable of forming a 5- to 12-membered ring together with an electrophilic center (the carbon atom marked with *) which is formed by oxidation; Nu represents a nucleophilic group; and n represents an integer of 1 or 2, said dye-releasing redox compound providing a color image of high density;

imagewise exposing the heat-developable color photographic material;

developing the photographic material by heating the material to a temperature in the range of 80° C. to 250° C. to release a hydrophilic diffusible dye; and transferring the diffusible dye onto an image receiving material.

41. A method of forming a color image as claimed in claim 40, wherein the transferring of the diffusible dye is carried out using a transfer solvent.

42. A method of forming a color image as claimed in claim 41, wherein the transfer solvent is water, an alkaline aqueous solution, an organic solvent having a low boiling point or a mixture thereof.

43. A method of forming a color image as claimed in claim 40, wherein the image receiving material contains a mordant for the diffusible dye.

44. A method of forming a color image as claimed in claim 43, wherein the mordant for the diffusible dye is a polymer mordant.

* * * * *